(12) United States Patent
Liao et al.

(10) Patent No.: US 9,590,473 B2
(45) Date of Patent: Mar. 7, 2017

(54) AUTOMOBILE ROLLER-TYPE POWER GENERATING DEVICE

(71) Applicants: Jen Li Liao, New Taipei (TW); Yu Seng Liao, New Taipei (TW); Wen Hua Liao Hu, New Taipei (TW); Hsuan Hsien Liao, New Taipei (TW); Fang Ying Liao, New Taipei (TW)

(72) Inventors: Jen Li Liao, New Taipei (TW); Yu Seng Liao, New Taipei (TW); Wen Hua Liao Hu, New Taipei (TW); Hsuan Hsien Liao, New Taipei (TW); Fang Ying Liao, New Taipei (TW)

( * ) Notice: Subject to any disclaimer, the term of this patent is extended or adjusted under 35 U.S.C. 154(b) by 0 days.

(21) Appl. No.: 14/960,886

(22) Filed: Dec. 7, 2015

(65) Prior Publication Data
US 2016/0164373 A1   Jun. 9, 2016

(30) Foreign Application Priority Data
Dec. 9, 2014 (TW) .............................. 103142716 A

(51) Int. Cl.
*H02K 7/18* (2006.01)
*H02K 7/116* (2006.01)
(Continued)

(52) U.S. Cl.
CPC .......... *H02K 7/1846* (2013.01); *B60K 25/08* (2013.01); *F03G 7/08* (2013.01); *H02K 7/003* (2013.01); *H02K 7/116* (2013.01)

(58) Field of Classification Search
CPC ...... H02K 7/1846; H02K 7/003; H02K 7/116; H02K 7/065; H02K 7/1807; H02K 33/12;
(Continued)

(56) References Cited

U.S. PATENT DOCUMENTS 3,637,956 A * 1/1972 Blackman ................ B60M 1/30
174/117 A
4,021,690 A * 5/1977 Burton .................. B60C 23/041
180/65.51
(Continued)

FOREIGN PATENT DOCUMENTS

TW          M319862 U     10/2007

*Primary Examiner* — Tulsidas C Patel
*Assistant Examiner* — Joseph Ortega
(74) *Attorney, Agent, or Firm* — Muncy, Geissler, Olds & Lowe, P.C.

(57) ABSTRACT

An automobile roller-type power generating device installed at the bottom of a vehicle body includes: a roller pivotally coupled to a camshaft and having a notch; a push slider having an arc bottom and installed in the notch of the roller, and the notch being in a shape corresponsive to the push slider and slightly greater than the push slider to allow the push slider to slide up and down; and a power generating mechanism installed above the pushrod. When the motor vehicle moves to roll the roller, the arc bottom presses the ground and slides into the roller to allow the push slider to slide up and down to transmit kinetic energy to the power generating mechanism, and the power generating mechanism converts the kinetic energy into electric energy to achieve the effect of generating power generation and storing electric energy into the battery.

14 Claims, 23 Drawing Sheets

(51) Int. Cl.
*H02K 7/00* (2006.01)
*B60K 25/08* (2006.01)
*F03G 7/08* (2006.01)

(58) Field of Classification Search
CPC ... F03G 7/08; B06K 25/08; B60K 25/08; F16H 21/40
USPC .......... 290/1 R; 180/2.1, 202, 65, 166, 65.31
See application file for complete search history.

(56) References Cited

U.S. PATENT DOCUMENTS

| | | | | |
|---|---|---|---|---|
| 4,179,631 A * | 12/1979 | Funderburg | ............ | H02K 33/12 310/20 |
| 4,476,947 A * | 10/1984 | Rynbrandt | ................ | B60L 9/00 180/2.1 |
| 5,270,594 A * | 12/1993 | Hulsing, II | ................ | H01F 7/14 310/15 |
| 5,656,901 A * | 8/1997 | Kurita | ...................... | A63F 13/06 318/114 |
| 6,291,901 B1 * | 9/2001 | Cefo | ......................... | B60L 8/00 290/1 R |
| 7,466,049 B1 * | 12/2008 | Vancea | ..................... | B60B 7/20 180/65.1 |
| 7,518,274 B1 * | 4/2009 | Mancl | .................... | H02K 33/02 310/242 |
| 7,791,292 B2 * | 9/2010 | Glasl | ....................... | B60L 9/18 191/2 |
| 2002/0079748 A1 * | 6/2002 | Lee, II | ................... | F04B 35/04 310/15 |
| 2002/0097012 A1 * | 7/2002 | Lim | ....................... | H02K 1/146 318/119 |
| 2003/0034697 A1 * | 2/2003 | Goldner | ............ | B60G 17/0157 310/17 |
| 2003/0140999 A1 * | 7/2003 | Smith | ................... | B60C 1/0016 152/524 |
| 2004/0100100 A1 * | 5/2004 | Wilson | .................. | B60C 23/041 290/1 R |
| 2005/0168092 A1 * | 8/2005 | Lim | ....................... | H02K 33/12 310/168 |
| 2007/0035134 A1 * | 2/2007 | Bristow, Jr. | ............... | F03D 3/06 290/1 R |
| 2007/0170791 A1 * | 7/2007 | Hargett | ..................... | F03G 7/08 310/67 A |
| 2007/0187957 A1 * | 8/2007 | Harrison | .................... | F03G 7/08 290/1 R |
| 2007/0205691 A1 * | 9/2007 | Hattori | .................. | B60C 23/041 310/311 |
| 2008/0122227 A1 * | 5/2008 | Hammerle | ............. | B60R 25/00 290/1 R |
| 2009/0091196 A1 * | 4/2009 | Cooper | .................. | H02K 7/075 310/24 |
| 2009/0322099 A1 * | 12/2009 | Labankoff | ................ | F03G 3/08 290/1 R |
| 2011/0068638 A1 * | 3/2011 | Cooper | .................. | H02K 7/075 310/24 |
| 2011/0278079 A1 * | 11/2011 | Stoicoviciu | ............. | B60L 5/005 180/2.1 |
| 2012/0146339 A1 * | 6/2012 | Lee | ...................... | H02K 7/1846 290/1 C |

* cited by examiner

AUTOMOBILE ROLLER-TYPE POWER GENERATING DEVICE

TECHNICAL FIELD

The technical field relates to a power generating device, and more particularly to an automobile roller-type power generating device installed to a vehicle body and capable of using the kinetic energy produced by moving the vehicle and converting the kinetic energy into continuous reciprocating thrust, so as to achieve the effect of converting kinetic energy into electric energy.

BACKGROUND

With reference to FIG. 1 for a prior art of generating power by a motor vehicle as disclosed in R.O.C. Patent No. M319862, an edge of a tire includes a groove, a wheel rim, and a stator silicon steel sheet fixed thereto, and the stator silicon steel sheet further includes a copper wire and a magnet plate; and an axle is fixed to the wheel rim wheel rim, and the rotor turntable is sheathed on the axle and further includes a magnet plate installed thereto and arranged with the same polarity of the magnet plate of the stator silicon steel sheet; a small gear is installed to a gear axle and engaged to a gear of the rotor turntable, and the gear turntable further has an eccentric shaft; the stator silicon steel sheet has an air compressor cylinder, and a spring, a piston, and an air pushing plate installed in the cylinder also a partition plate, and the air pushing plate is pivotally coupled to the eccentric shaft; a return wheel lever is passed through the axle and fixed to the center of the rotor turntable; two pushrods are installed opposite to each other, and each pushrod is pivotally coupled to both ends of the return wheel lever; and a copper wire is coupled to a charger and a battery. Therefore, this device has the effects of improving the dynamic force of the motor vehicle to generate power, inflating tires automatically, and saving fuels.

Although this patented technology can drive the return wheel lever, and the rotor turntable to rotate with the tires and produce rotation for the rotor turntable and the stator silicon steel sheet to generate electric power, yet the rotary power generator is applicable for a turbine mechanism such as turbines of hydroelectric and thermal power plants. During the operation of the turbine, the rotor of the power generator is driven to rotate and generate power, and the conventional motor vehicle using tires to generate power requires complicated mechanisms, and the power generation is limited by the existing volume or space of the tires and the stability of use (such as maintenance and repair as well as change of the tires), and thus the application still has difficulty. Obviously, such design requires breakthroughs and improvements.

Since the technology for converting kinetic energy into electric energy (by a power generator) is already a common art, the problems reside on how to use the dynamic potentials produced while the vehicle body is moving and how to implement the technology into the motor vehicle effectively. Therefore, it is a subject for related manufacturers to overcome the drawbacks of the conventional way of generating electric power from kinetic energy by using the dynamic potentials produced while the motor vehicle is moving.

SUMMARY

In view of the drawbacks of the prior art, the discloser of this disclosure based on years of experience in the related industry to conduct extensive researches and experiments, and finally provided a feasible solution and developed an automobile roller-type power generating device in accordance with this disclosure to overcome the drawbacks of the prior art.

Therefore, it is a primary objective of this disclosure to provide an automobile roller-type power generating device that can be combined to a vehicle body conveniently, and the kinetic energy for moving the vehicle body forward is fully utilized and stably converted into continuous reciprocating thrust, so as to convert the kinetic energy into electric energy by the power generating mechanism effectively.

To achieve the aforementioned objectives, this disclosure provides an automobile roller-type power generating device installed at the bottom of a vehicle body, comprising: at least one roller, pivotally coupled to a camshaft of the vehicle body, and touching the ground when the roller is rolling, and the roller having at least one notch; at least one push slider, installed in the notch, and having at least one pushrod, and an end of the push slider touching the ground having an arc bottom, and the pushrod being abutted by a spring and protruded in a direction towards an outer side of the roller; at least one power generating mechanism, installed at a corresponsive abutting position of the pushrod; at least one battery, electrically coupled to the power generating mechanism; such that when the vehicle body is moving, the automobile roller-type power generating device drives the roller to roll, and the push slider presses the ground and retracts and slides to transmit kinetic energy to the power generating mechanism, and the power generating mechanism converts the kinetic energy into electric energy which is stored in the battery.

In the aforementioned device, the spring is positioned and abutted at the notch to push the pushrod, and the pushrod is passed and installed to a bearing in the notch.

In the aforementioned device, the pushrod has an arc top disposed opposite to the other end of the arc bottom, and the arc top has an arc sliding surface.

In the aforementioned device, the notch has a side notch formed on each of both sides of the notch, and a side sliding member is coupled to each of both sides of the push slider, and the side sliding member is coupled to a side of the arc bottom, and the side sliding member slides with respect to the side notch, and at least one of the side sliding members is passed and installed to a bearing in the side notch.

In the aforementioned device, the side sliding members on both sides of the push slider are integrally coupled to a side opposite to the arc top.

In the aforementioned device, the pushrod includes an upper-section pushrod and a lower-section pushrod separated from each other, and the position of separating the upper-section pushrod and the lower-section pushrod is the cross-sectional position of the camshaft.

In the aforementioned device, the power generating mechanism comprises: a fixed frame, installed and fixed to the vehicle body; a linkage rod, having an elastic pulley pivoted thereto; and a kinetic energy converting mechanism, linked by the linkage rod.

In the aforementioned device, the elastic pulley is pivoted to a connecting cover and the connecting cover is installed to a lower distal point of the linkage rod.

In the aforementioned device, the kinetic energy converting mechanism is a pedal power generator, a linear power generator, a touch pressing power generator, a gear power generator, a hydraulic power generator, or any combination of the above.

In the aforementioned device, the fixed frame includes a first frame and a second frame, and each of the first frame and the second frame has a notch space, and the linkage rod is extended in a direction away from the elastic pulley and separated into a first linkage rod and a second linkage rod, and each of the first linkage rod and the second linkage rod is extended upwardly in the respective notch space of the first frame and the second frame, and tops of the first linkage rod and the second linkage rod are coupled by a connecting frame, so that the first linkage rod, the second linkage rod and the connecting frame may be moved vertically to link the power generating mechanism to generate power.

In the aforementioned device, each of the first frame and the second frame has an elongated through slot, a connecting stand is coupled between the first frame and the second frame, and each of the first frame and the second frame is fixed and coupled to the camshaft.

In the aforementioned device, the device further comprises an automatic controller, and the battery has at least two battery packs and is coupled to a motor, and the two battery packs are a first battery pack and a second battery pack respectively and charged by a power generator according to a method comprising the steps of supplying power from the first battery pack to a power consuming device, temporarily stopping the power supply from the first battery pack through the control of an automatic controller and allowing the second battery pack to take over the power supply if the remained power level of the first battery pack is 10%~20%, and charging the first battery pack through all power generators until the first battery pack is fully charged, and temporarily stopping the power supply from the second battery pack through the control of the automatic controller if the remained power level of the second battery pack is 10%~20%, such that the first battery pack takes over the power supply again, so that the power generators charge the two battery packs alternately.

This disclosure will become clearer in light of the following detailed description of an illustrative embodiment of this invention described in connection with the drawings.

DESCRIPTION OF THE PREFERRED EMBODIMENTS

Figure 1:
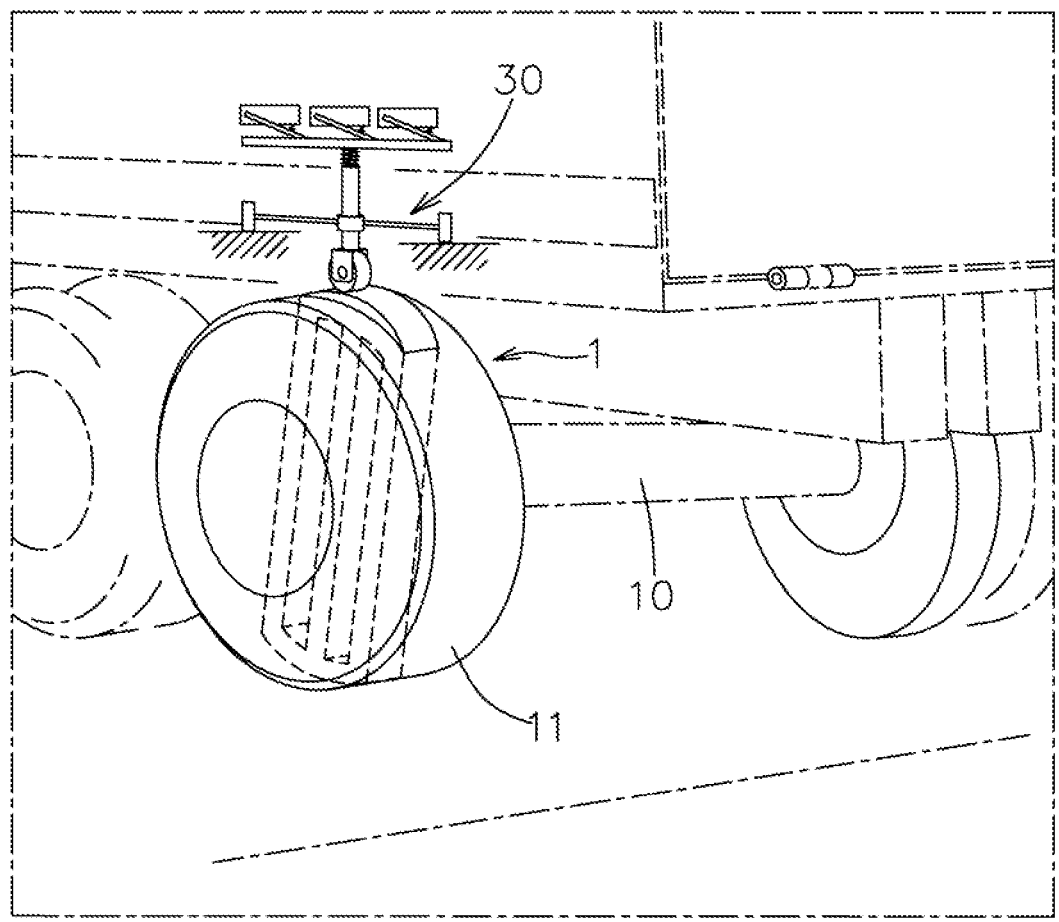
FIG. 1 is a first schematic view of an application of this disclosure.
Figure 2:
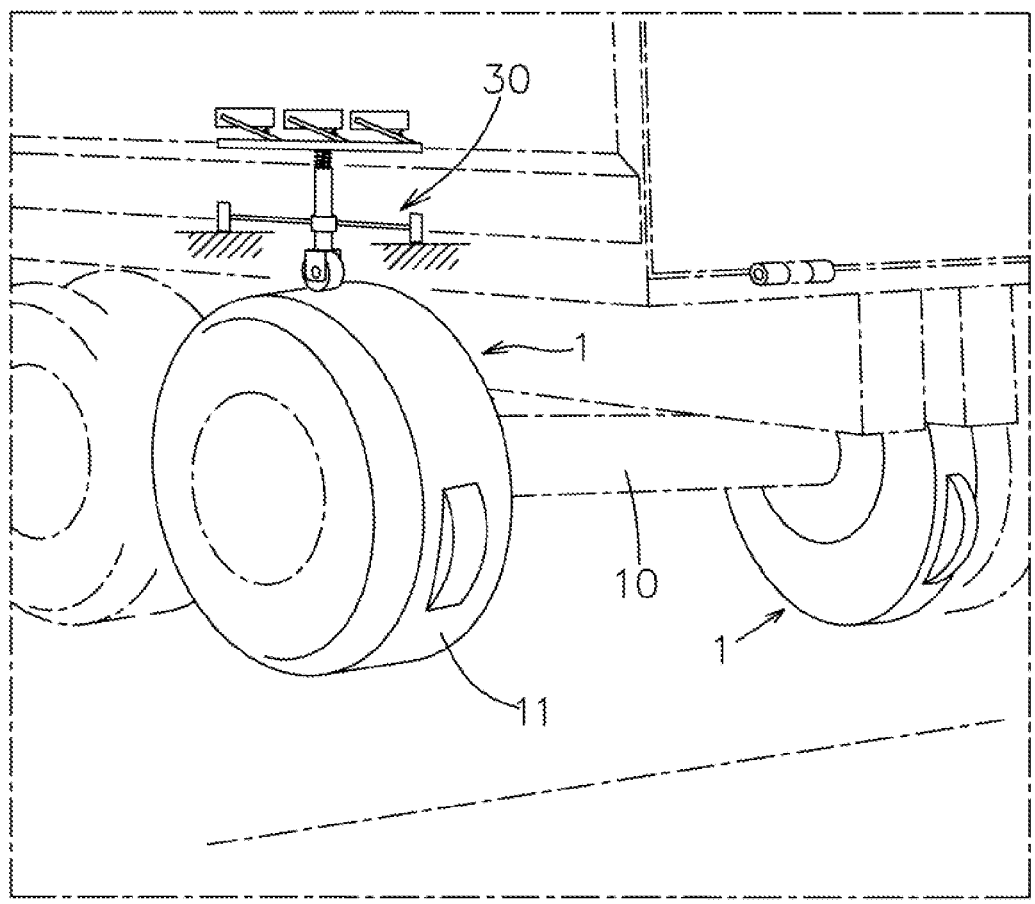
FIG. 2 is a second schematic view of an application of this disclosure.
Figure 3:
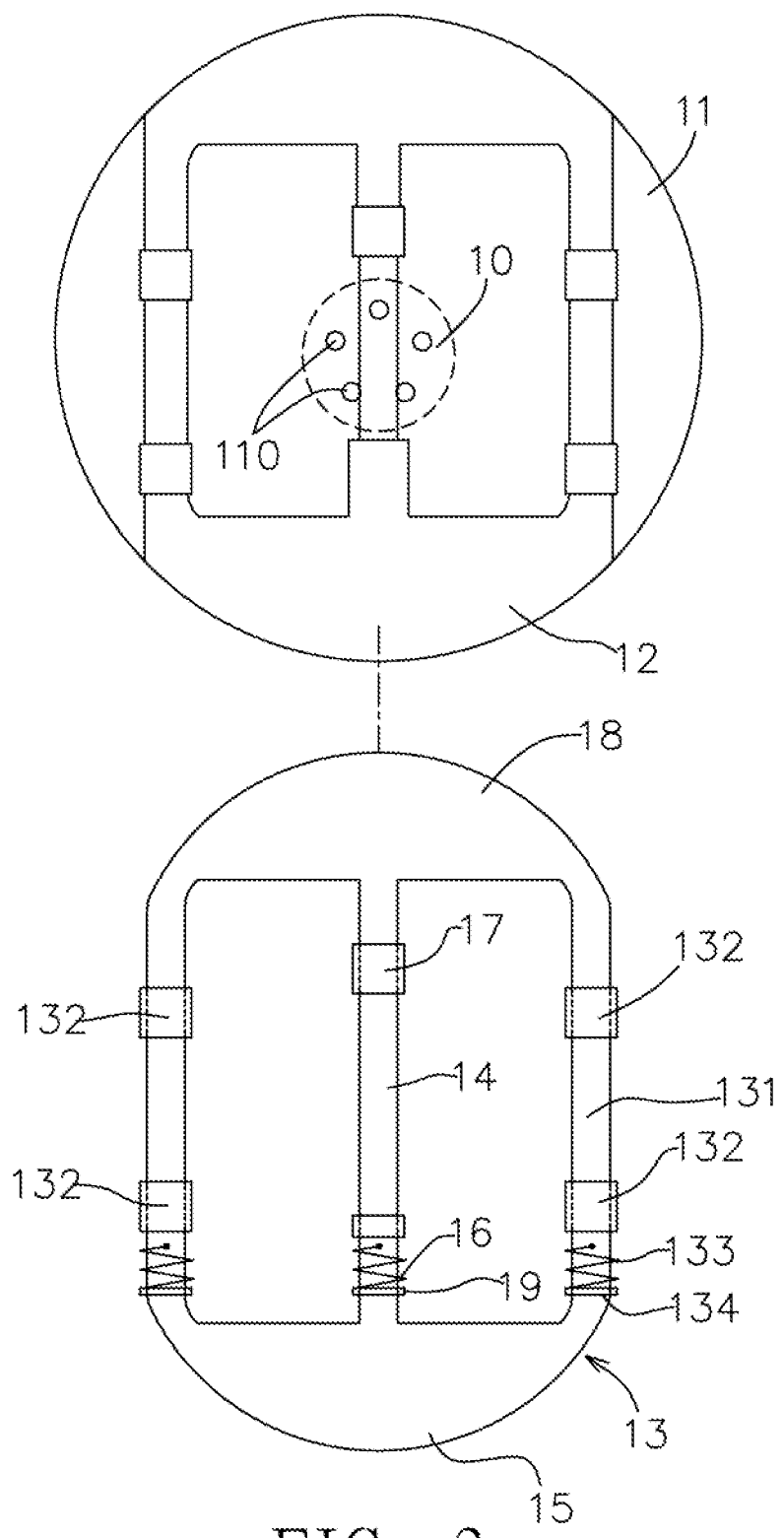
FIG. 3 is an exploded view of a push slider of a first preferred embodiment of this disclosure.
Figure 4:
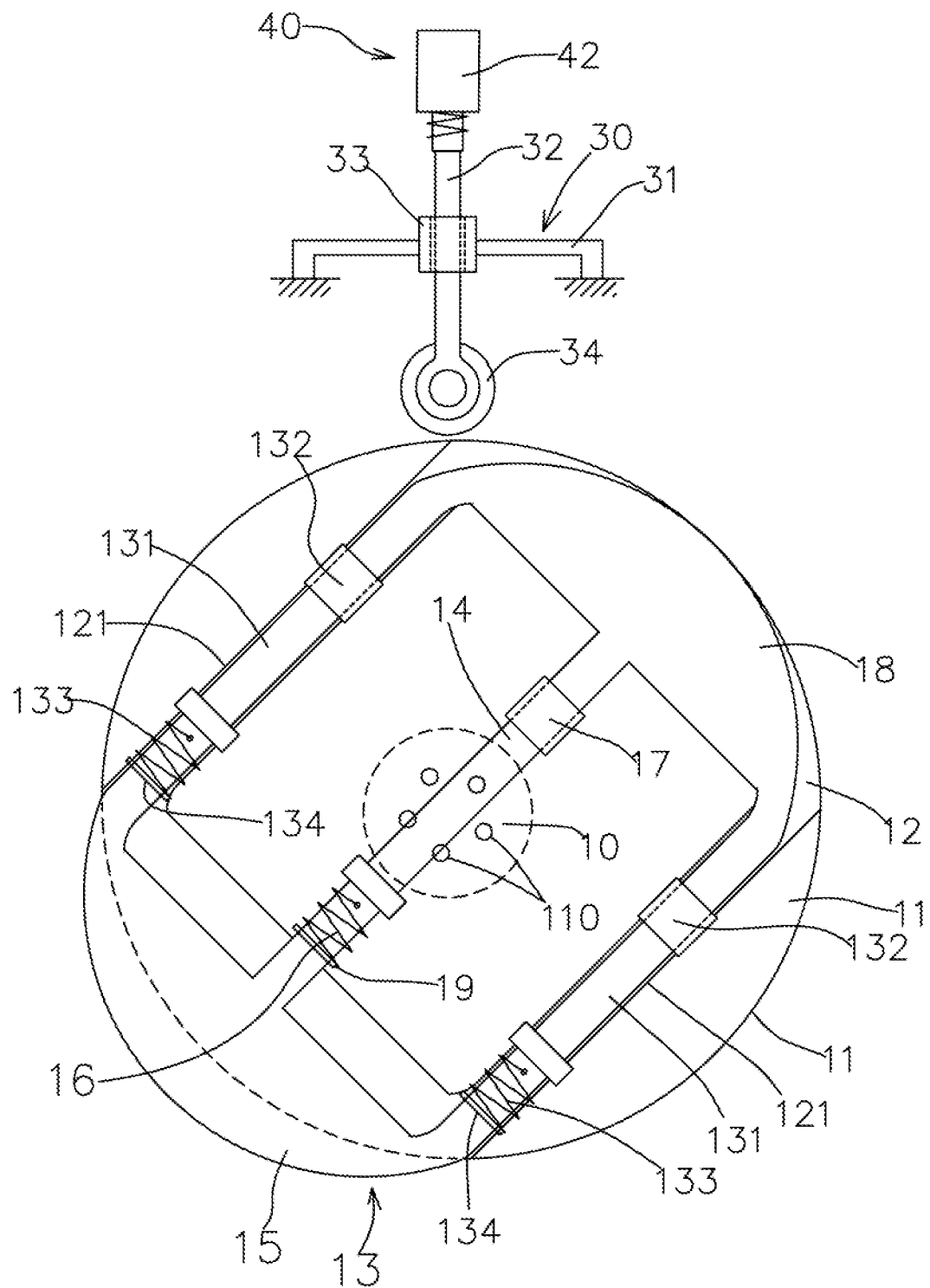
FIG. 4 is a first schematic view of an operating status of the first preferred embodiment of this disclosure.
Figure 5:
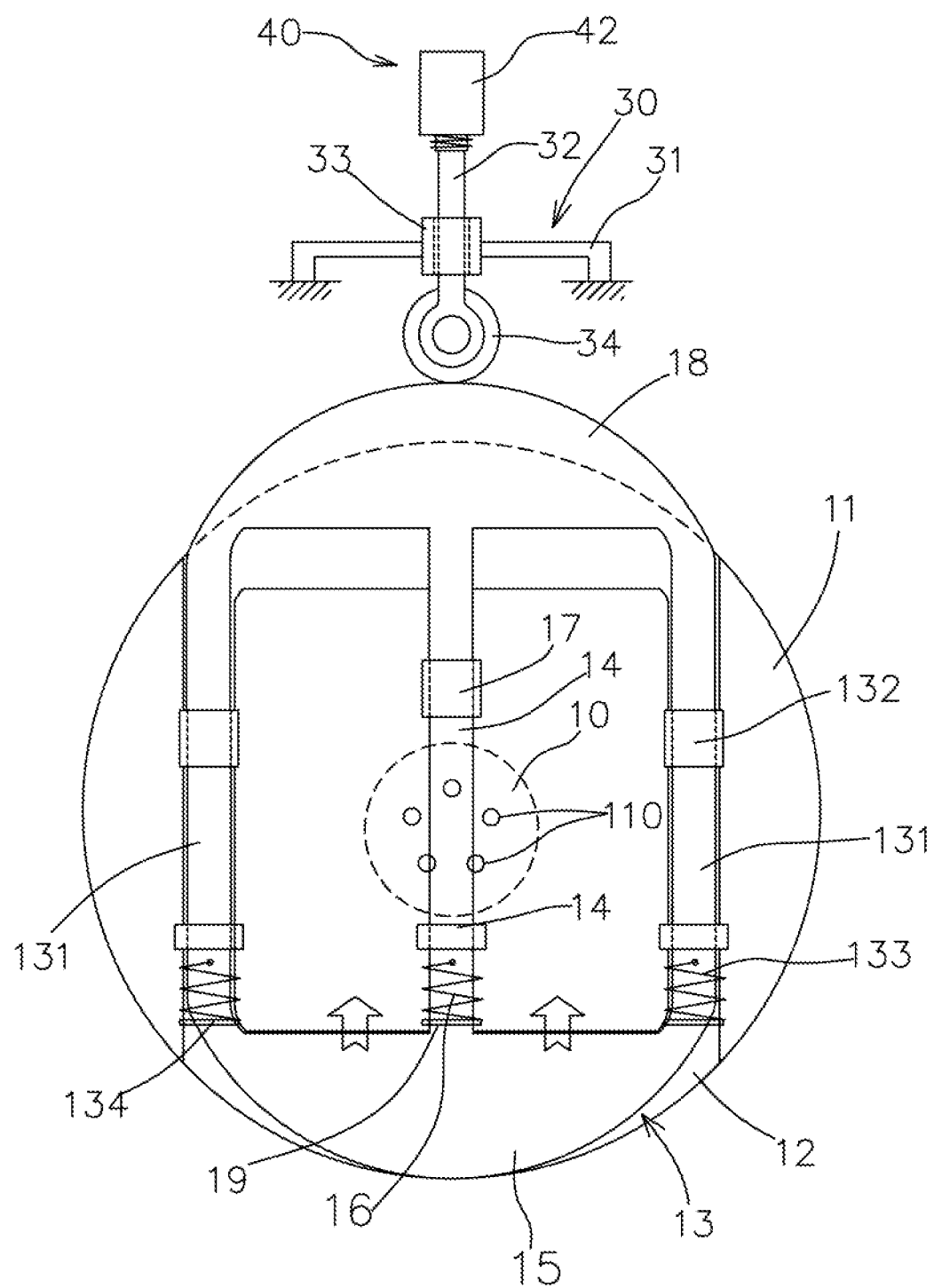
FIG. 5 is a second schematic view of an operating status of the first preferred embodiment of this disclosure.

With reference to FIGS. 1 to 5 for an automobile roller-type power generating device 1 in accordance with the first preferred embodiment of this disclosure, the automobile roller-type power generating device 1 is applicable to a vehicle body having a rotary shaft or a wheel. In this preferred embodiment, the automobile roller-type power generating device 1 with a camshaft 10 installed at the bottom of a vehicle body of the motor vehicle comprises at least one roller 11, a push slider 13 and a power generating mechanism 30, wherein the roller 11 is pivotally coupled to the camshaft 10 through a positioning hole 110, and the roller 11 may be a rolling member other than a car wheel (or wheel), and the roller 11 touches the ground and rolls on the ground. The roller 11 includes at least one notch 12, which is a groove with a depth of 3~10 cm concavely formed on the roller 11, and the notch 12 is provided for installing the push slider 13 which is a bar, a board, or a combination thereof. The push slider 13 includes at least one pushrod 14, and the bottom of the push slider 13 (which is the end touching the ground) is an arc bottom 15 protruded towards both sides, and a spring 16 is sheathed on the pushrod 14 and the top of the spring 16 is positioned and abutted at the notch 12, and the bottom of the spring 16 is abutted at the pushrod 14. For example, the pushrod 14 has an abutting ring 19 at the bottom of the spring 16, so that the pushrod 14 is abutted in a direction towards the outside by an elastic force. In other words, the pushrod 14 is pressed by the spring 16 to protrude in a direction towards the outer side of the roller 11, and the pushrod 14 has a bearing 17. In other words, the bearing 17 is installed at an appropriate position inside the notch 12, so that the pushrod 14 can slide more smoothly in the notch 12. The notch 12 is in a shape corresponsive to the push slider 13 and slightly greater than the push slider 13, so that the push slider 13 can slide in the notch 12. When the push slider 13 slides in a direction towards the outer side (in the downward direction as shown in FIG. 3), the arc bottom 15 is exposed from the roller 11; and when the push slider 13 is pressed by the ground to slide towards the inner side (in the upward direction as shown in FIG. 5), the arc bottom 15 slides towards the roller 11. There is no specific limitation on the material and size of the arc bottom 15. In this preferred embodiment, the arc bottom 15 is made of steel, and has a width approximately equal to 3~5 cm. In addition, the power generating mechanism 30 is installed at the top of the pushrod 14 when touching the ground and the power generating mechanism 30 is electrically coupled to a battery (not shown in the figure).

In an embodiment, the motor vehicle is moved to drive the roller 11 to roll. When the roller 11 rolls, the arc bottom 15 exposed from the roller 11 presses the ground, and the pressure of the ground drives the arc bottom 15 to slide into the roller 11. Now, the push slider 13 slides upward in the notch 12, so that the pushrod 14 of the push slider 13 also slides upward, and the kinetic energy of the pushrod 14 is transmitted to the power generating mechanism 30. When the pushrod 14 of the push slider 13 slides downward, the spring 16 is abutted by the abutting ring 19 to produce an elastic restoring force (as shown in FIG. 5), so that when the motor vehicle continues to move forward, the roller 11 rolls forward to release the arc bottom 15 from being pressed by the ground, and the arc bottom 15 is exposed from the roller 11 by the elastic force of the spring 16. Until the arc bottom 15 is pressed by the ground again (after a revolution), the pushrod 14 (or the push slider 13) pushes the power generating mechanism 30 to generate power, so as to convert the kinetic energy into electric energy repeatedly, and store the electric energy into the battery.

In an appropriate method of the embodiment, an end of the pushrod 14 of the push slider 13 (opposite to the other end of the arc bottom 15) is an arc top 18 such as a meniscus end with an arc sliding surface. With the arc sliding surface of the arc top 18, the operation for the pushrod 14 to transmit kinetic energy of the power generating mechanism 30 becomes smoother.

In addition, both sides of the notch 12 have a side notch 121, and both sides of the push slider 13 have a side sliding member 131, and the side sliding member 131 is a bar or a plate, and the side sliding member 131 is integrally combined with a lateral side of the arc bottom 15. In other words, the side sliding member 131 is extended from the lateral side of the arc bottom 15 towards the interior of the roller 11 and slides in the respective side notch 121, so as to stabilize the sliding of the push slider 13. Further, the side sliding member 131 and the arc top 18 are integrally coupled. In other words, the side sliding member 131 is integrally combined between the arc bottom 15 and the arc top 18, so that the push slider 13, the arc bottom 15 and the arc top 18 form an integrally connected ring. Like the positioning assembly of the pushrod 14 (or the push slider 13), the side sliding member 131 also comprises a bearing 132 and a spring 133 abutted by an abutting ring 134, and the bearing 132 is positioned in the side notch 121, so as to provide a more smooth sliding of the side sliding members 131.

In an appropriate method of the embodiment, the arc top 18 and the arc bottom 15 are substantially in the same shape, and thus the functions of the arc top 18 and the arc bottom 15 may be exchanged. In other words, the arc top 18 may be used for pressing the arc bottom 15 to the ground, such that the push slider 13 slides upward in the notch 12 to transmit the kinetic energy of the pushrod 14 to the power generating mechanism 30, and the power generating mechanism 30 converts the kinetic energy into electric energy and stores the electric energy into the battery. When the automobile roller-type power generating device 1 of this disclosure is operated, and the roller 11 rolls for one round, the number of times of converting kinetic energy into electric energy is doubled, and the amount of generated power is also doubled.

Figure 6:
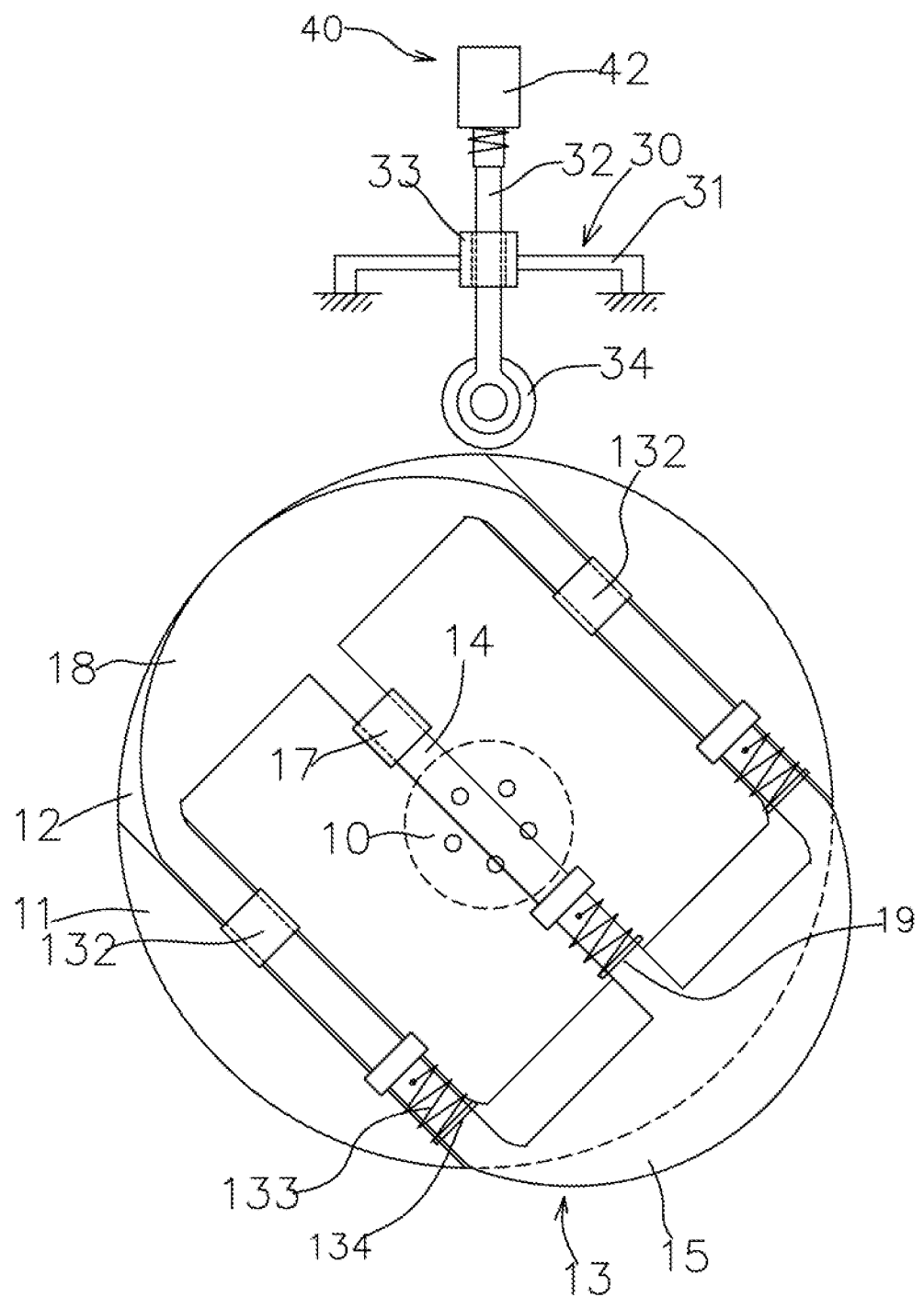
FIG. 6 is a third schematic view of an operating status of the first preferred embodiment of this disclosure.

In FIGS. 4 to 7, the power generating mechanism 30 further comprises: a fixed frame 31, installed and fixed at an appropriate position of the vehicle body; a linkage rod 32, having a bearing 33 installed thereto and positioned at the fixed frame 31, and an elastic pulley 34 pivoted to a lower distal point of the linkage rod 32; a kinetic energy converting mechanism 40 (which is a linear power generator 42 as shown in the figures), installed in a corresponsive operating direction (such as an upward direction) of the linkage rod 32. with reference to FIGS. 4 to 6 for the relation between the roller 11, the pushrod 14 of the push slider 13, and the power generating mechanism 30 when the automobile roller-type power generating device 1 of this disclosure rotates one round. When the pushrod 14 of the push slider 13 slides upward, the kinetic energy is transmitted to the elastic pulley 34 of the linkage rod 32 of the power generating mechanism 30, so that the linkage rod 32 slides upward to transmit the kinetic energy to the kinetic energy converting mechanism 40/linear power generator 42 (as shown in FIG. 5). The kinetic energy converting mechanism 40 converts the kinetic energy into electric energy and stores the electric energy into the battery. Therefore, the kinetic energy can be converted into the electric energy repeatedly, and the electric energy is stored into the battery. With the installation of the elastic pulley 34 of the power generating mechanism 30, when the linkage rod 32 slides upward to transmit kinetic energy to the kinetic energy converting mechanism 40, the energy for shaking sideway is absorbed to provide a smoother operation of sliding the linkage rod 32 upward.

Figure 7:
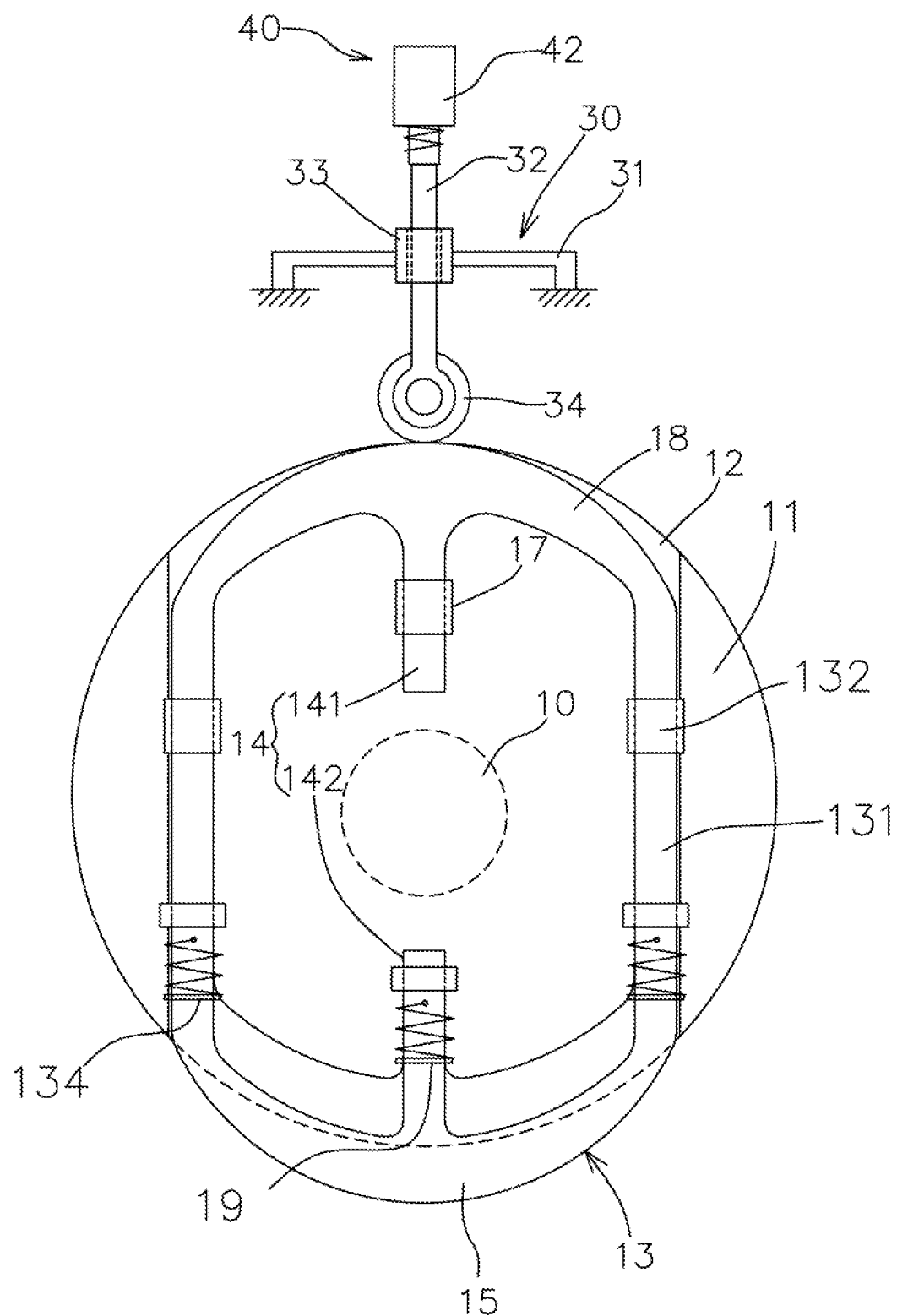
FIG. 7 is a schematic view of another exemplary embodiment of a push slider of the first preferred embodiment of this disclosure.

With reference to FIG. 7 for a schematic view of a push slider 13 in accordance with another embodiment of this disclosure, the difference between this embodiment and the previous embodiment resides on that the pushrod 14 of the push slider 13 includes an upper-section pushrod 141 and a lower-section pushrod 142 separated from each other, and the separating position of the upper-section pushrod 141 and the lower-section pushrod 142 is the cross-sectional position of the camshaft 10. Such design allows the pushrod 14 to avoid the camshaft 10, so that the push slider 13 may be installed at the camshaft 10, and a plurality of rollers 11 and a push slider 13 may be installed on the camshaft 10 for improving the power generation effect.

Figure 8:
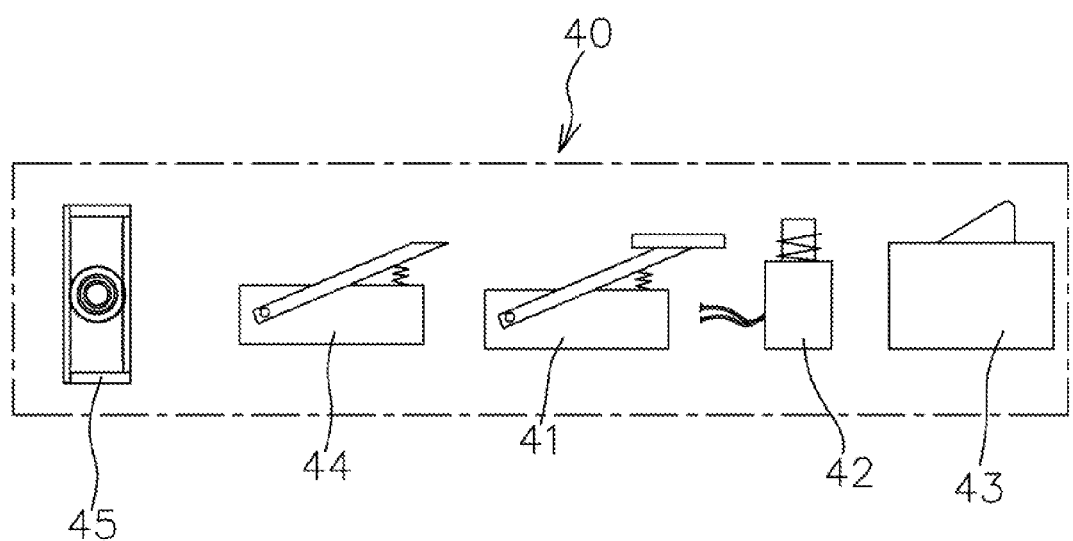
FIG. 8 is a schematic view of a power generating mechanism of this disclosure.

In FIG. 8, the kinetic energy converting mechanism 40 is a pedal power generator 41, a linear power generator 42, a touch pressing power generator 43, a hydraulic power generator 44 or a gear power generator 45. These power generators are characterized in that the kinetic energy for sliding and pushing the pushrod 14 of the push slider 13 upward can be received, and then the kinetic energy is converted into electric energy and the electric energy is stored in a battery, wherein the battery is a lithium iron (Li—Fe) battery.

Figure 9:
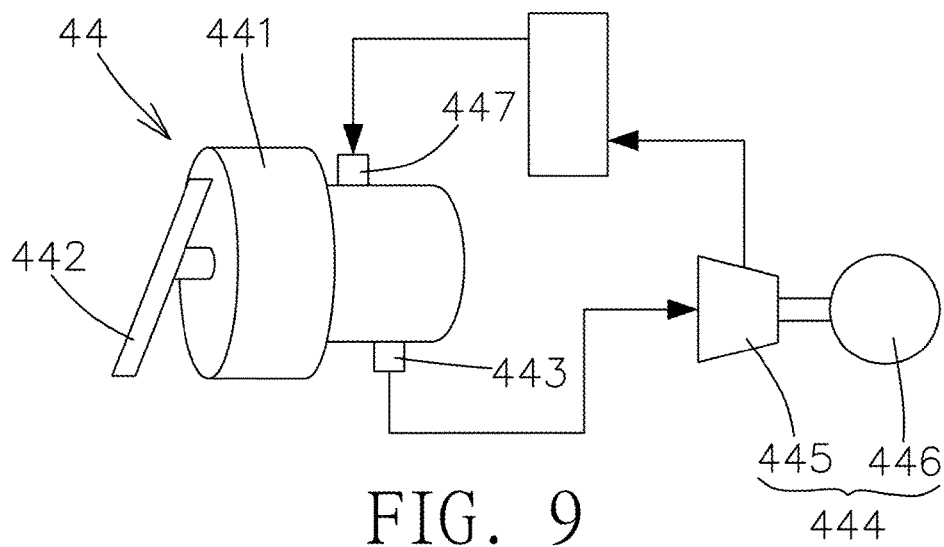
FIG. 9 is a schematic view of the structure of a hydraulic power generator of this disclosure.

With reference to FIG. 9 for a schematic view of a hydraulic power generator of this disclosure, the hydraulic power generator 44 comprises a hydraulic pump 441, a hydraulic bar 442 (or a hydraulic pedal) installed to the hydraulic pump 441, an oil inlet pipe 443 coupled to the hydraulic pump 441, a hydraulic motor 444 coupled to the oil inlet pipe 443 and including a vane module 445 and a power generating module 446, and an oil return pipe 447 coupled to the hydraulic motor 444, and the oil return pipe 447 is further coupled to the hydraulic pump 441 to form a pipeline circulation system. The hydraulic pump 441 includes an oil tank (not shown in the figure) disposed therein, a hydraulic oil stored in the oil tank, such that when the hydraulic bar 442 (or the hydraulic pedal) is driven, the hydraulic pump 441 draws hydraulic oil from the oil tank, and drives the hydraulic oil to produce high pressure; the high-pressure hydraulic oil enters through the oil inlet pipe 443 into the hydraulic motor 444, and rotates the vane module 445 of the hydraulic motor 444 and then links a rotary shaft (not shown in the figure) of the power generating module 446 to rotate, and the rotary shaft is coupled to a rotor wire, and the periphery of the rotor wire has a magnetic element, so that the rotor wire produces a change of magnetic flux during rotation to generate electric power. The hydraulic oil enters through an oil return pipe 447 into the oil tank which is connected to the oil return pipe 447, and such circular operation allows the hydraulic power generator to generate electric power.

Figure 9A:
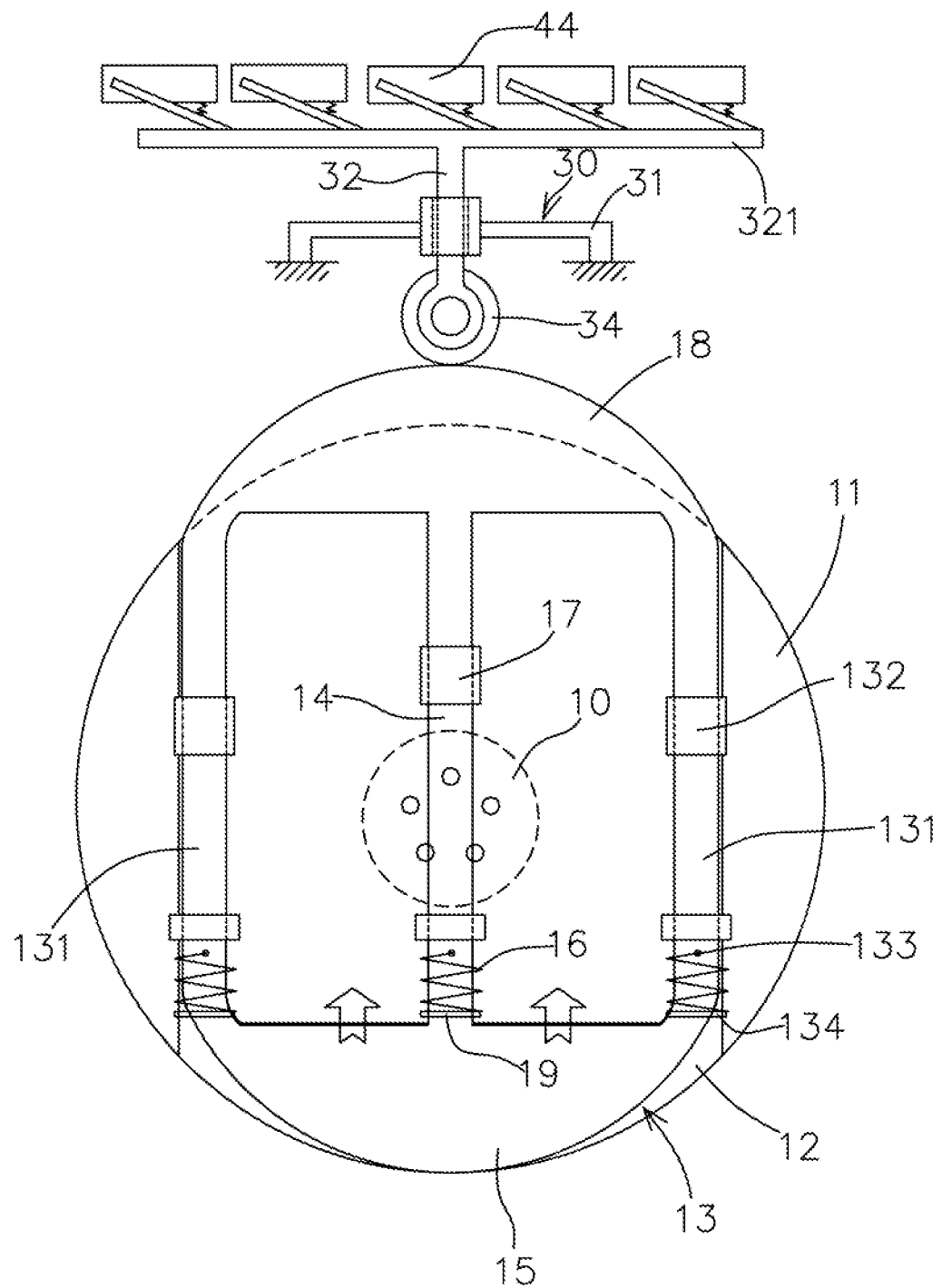
FIG. 9A is a schematic view of the operation of a hydraulic power generator of this disclosure.

With reference to FIG. 9A for a schematic view of the operation of a hydraulic power generator 44 of this disclosure, when the pushrod 14 of the push slider 13 slides upward, the kinetic energy is transmitted to the elastic pulley 34 of the linkage rod 32 of the power generating mechanism 30, and the linkage rod 32 slides upward to transmit kinetic energy to the hydraulic power generator 44. By the hydraulic power generator 44, the kinetic energy is converted into electric energy, and the electric energy is stored into the battery. In addition, the linkage rod 32 utilizes a pushing plate 321 to integrally link a plurality of hydraulic power generators 44, so as to increase the amount of generated power significantly.

The performance of the hydraulic power generator 44 of this disclosure is described below. If a hydraulic power generator 44 generating a power of 10 Kw requires 576000 cc of oil and the amount of oil required by the hydraulic pump 441 of the hydraulic power generator 44 is 160 cc, the required amount of oil for generating power for one hour is equal to 160 cc×60×60=57600 cc. On the other hand, if the amount of oil pressed out by the hydraulic power generator 44 of this disclosure is 13 cc for each time, and the hydraulic power generator 44 is pressed twice whenever each roller 11 rolls for a round. If the motor vehicle has two automobile roller-type power generating devices 1 of this disclosure, then the two rollers 11 press out 52 cc (13 cc×2×2=52 cc) of oil each when the roller 11 rolls for a round. If the motor vehicle moves at a speed of 120 Km/hr, and the circumference of the rollers 11 is 192 cm, then the rollers 11 rotate at 61855 rounds (120×1000÷194=61855) per hour. Therefore, a total amount of oil equal to 32166460 cc (52 cc×61855=32166460 cc) is pressed out in one hour, and the electric power outputted by using the total amount of oil is equal to 55.8 Kw (32166460 cc÷576000 cc=5.58, 5.58×10 Kw=55.8 Kw). In other words, a power of 55.8 Kw is generated per hour. Obviously, the power generation effect of this disclosure is excellent.

Figure 10:
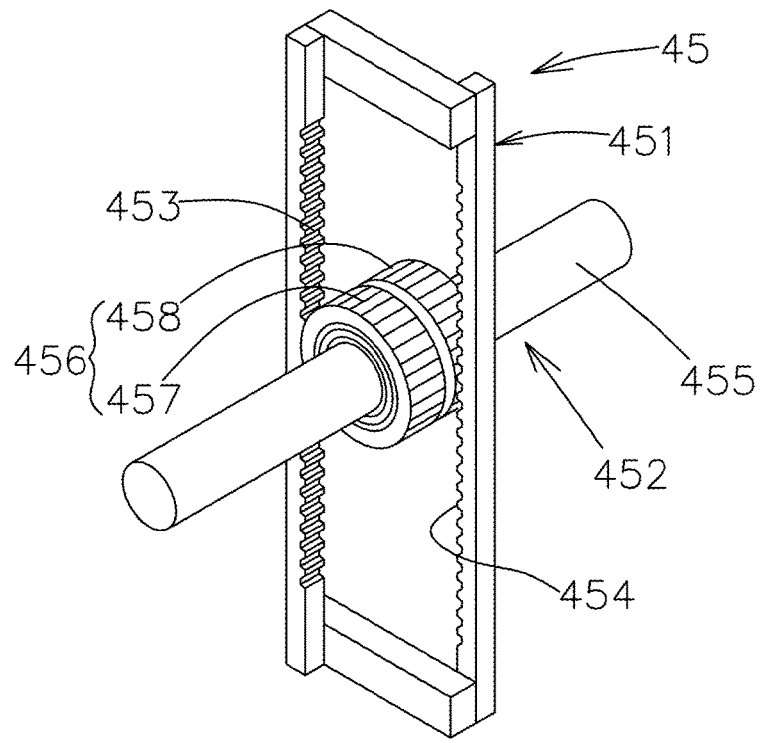
FIG. 10 is a schematic view of the structure of a gear power generator of this disclosure.
Figure 10A:
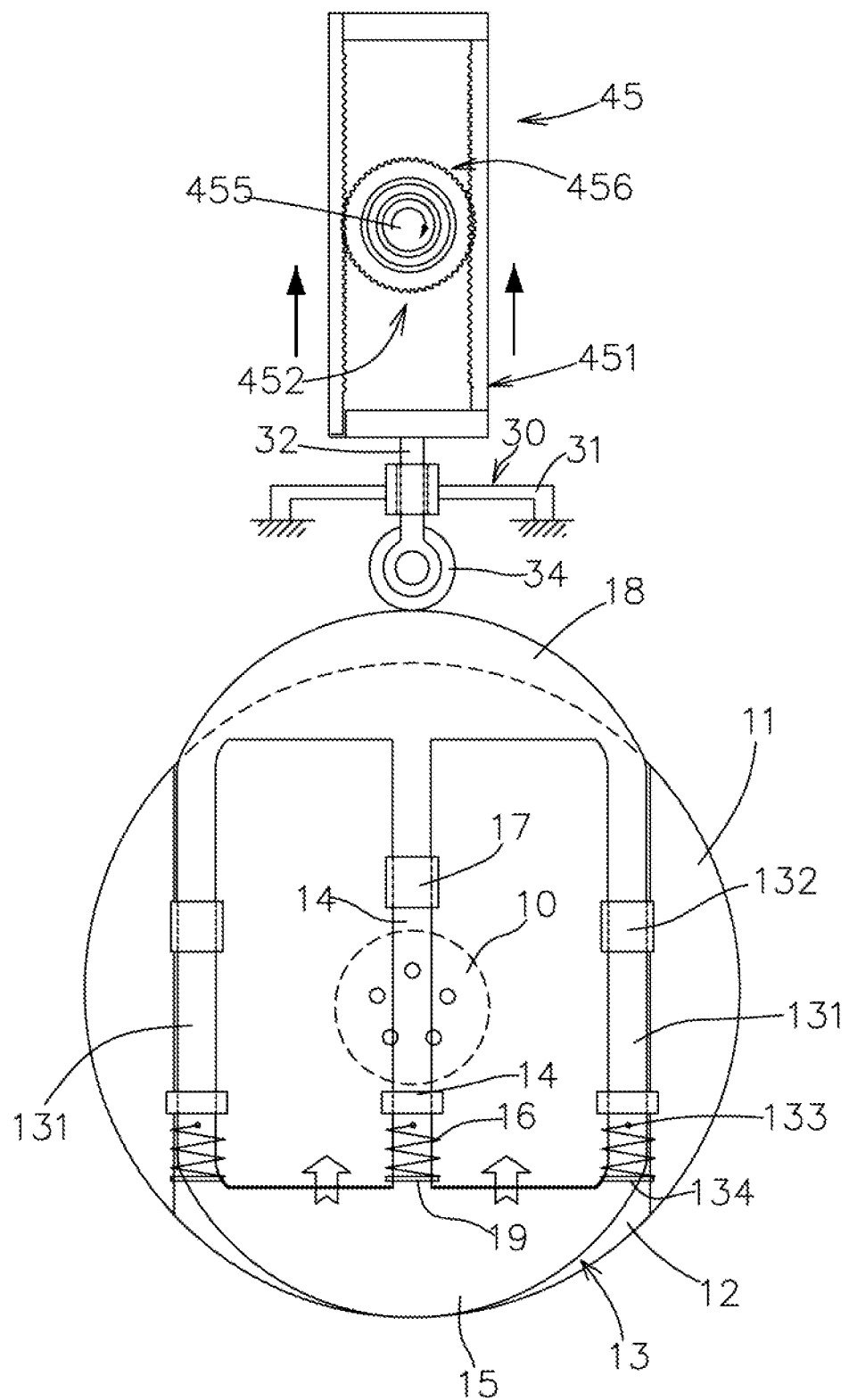
FIG. 10A is a schematic view of the operation of a gear power generator of this disclosure.

With reference to FIGS. 10 and 10A for a schematic view of the structure of of a gear power generator of this disclosure, the gear power generator 45 comprises a fixed frame 451 and a transmission module 452, and the fixed frame 451 is a frame installed at a pushing position of the linkage rod 32 and provided for positioning the transmission module 452, and the fixed frame 451 includes a first tooth pattern portion 453 and a second tooth pattern portion 454 disposed on two opposite sides respectively, and the first tooth pattern portion 453 and the second tooth pattern portion 454 are staggered (which are non-linearly arranged with respect to each other). The transmission module 452 includes a rotary shaft 455 and a gear set 456 installed to the rotary shaft 455, and the rotary shaft 455 is passed and installed in the fixed frame 451, and the gear set 456 includes a first gear 457 and a second gear 458 arranged parallel to each other, and the first gear 457 and the first tooth pattern portion 453 are engaged with each other, and the second gear 458 and the second tooth pattern portion 454 are engaged with each other. A power generating module (not shown in the figure) has a power generating assembly (prior art) with a rotor and a stator coupled to the rotary shaft 455, and the rotary shaft 455 is rotate to drive the power generating module to generate power. In FIG. 10A, the fixed frame 451 is linked by the linkage rod 32 to move up and down, and the fixed frame 451 drives the gear set 456 to rotate. Since the gear set 456 has a design of a ratchet gear, the gear set 456 may be rotated in one direction to cope with the same upward movement or the same downward movement of the fixed frame 451 each time, and the rotary shaft 455 has a single-direction rotation function. The rotary shaft 455 is rotated and linked to the power generating module for generating power. Two fixed frames 451 of the gear power generator 45 are embedded into two fixed seats (not shown in the figure) respectively, and the fixed seat is fixed to a motor vehicle, and the fixed seat has a notch (not shown in the figure), so that the fixed frame may be embedded into the notch for the upward and downward sliding movements, and a spring (not shown in the figure) is installed to the top position of the fixed seat notch, and the top of the spring is fixed to the fixed seat notch, and the bottom of the spring abuts the fixed frame 451, so that when the fixed frame 451 moves upward, an elastic potential energy is stored. When the upward pushing force disappears, an elastic force moves the fixed frame 451 downward, so that the fixed frame 451 of the gear power generator 45 has the reciprocating up and down movements.

Figure 12:
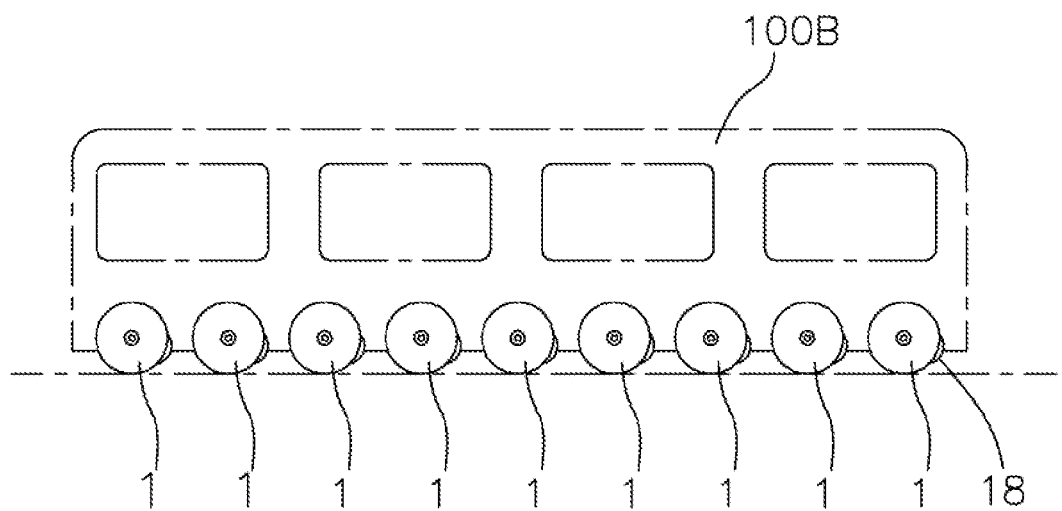
FIG. 12 is a second schematic view of this disclosure applied to a motor vehicle.
Figure 11:
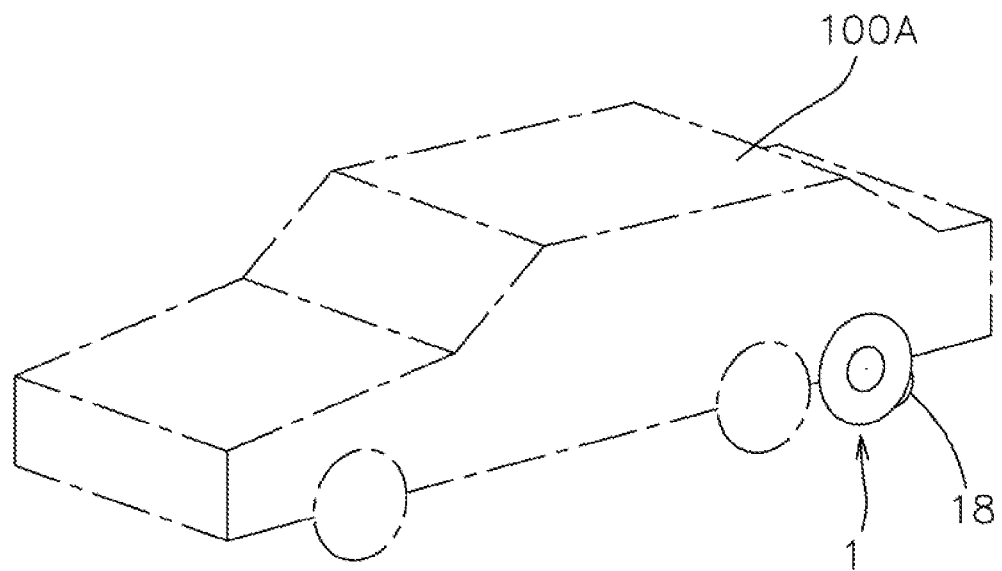
FIG. 11 is a first schematic view of this disclosure applied to a motor vehicle.
Figure 13:
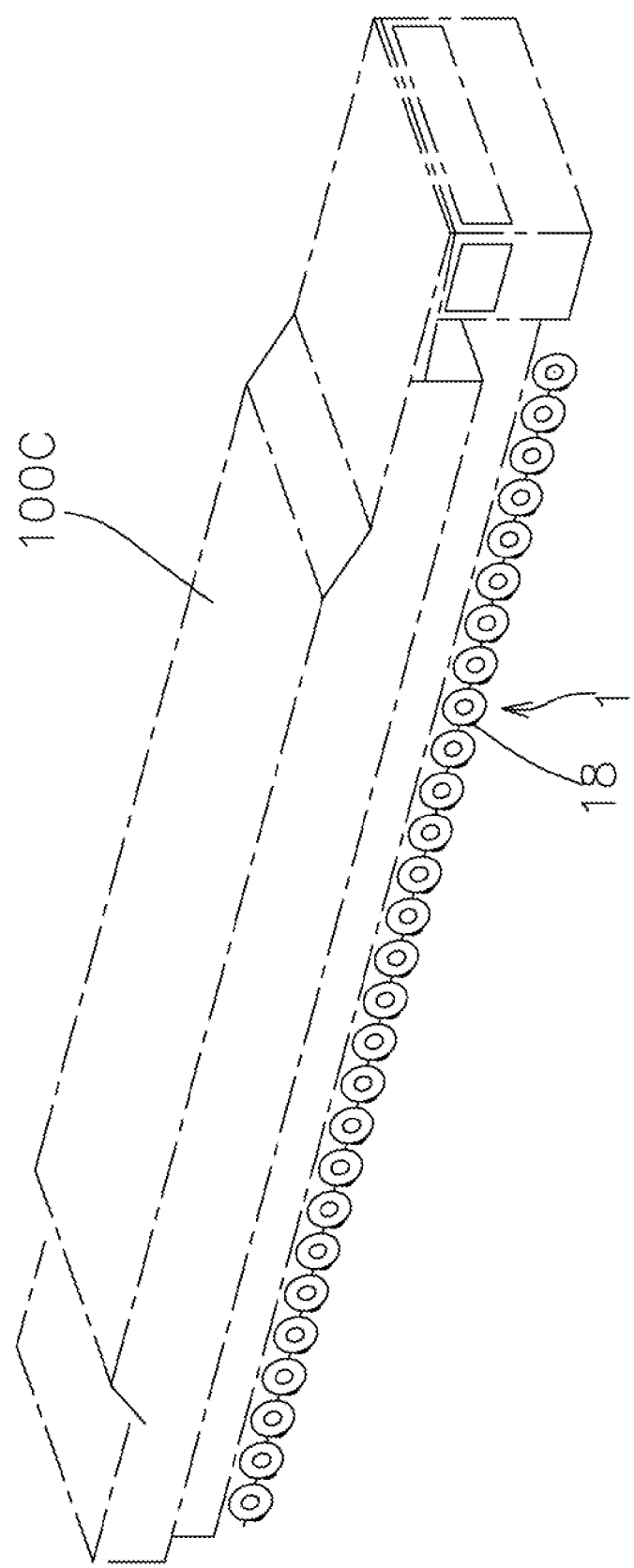
FIG. 13 is a third schematic view of this disclosure applied to a motor vehicle.
Figure 14:
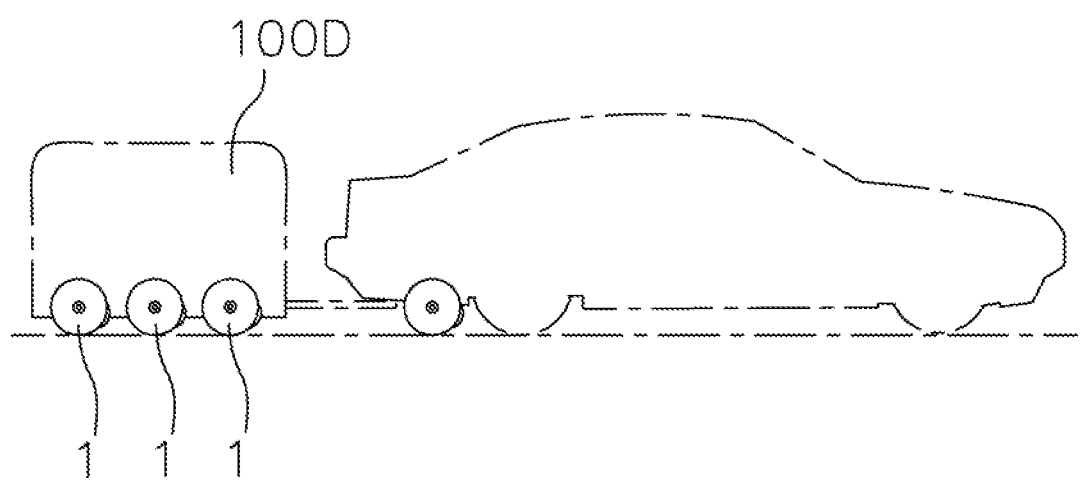
FIG. 14 is a fourth schematic view of this disclosure applied to a motor vehicle.
Figure 15:
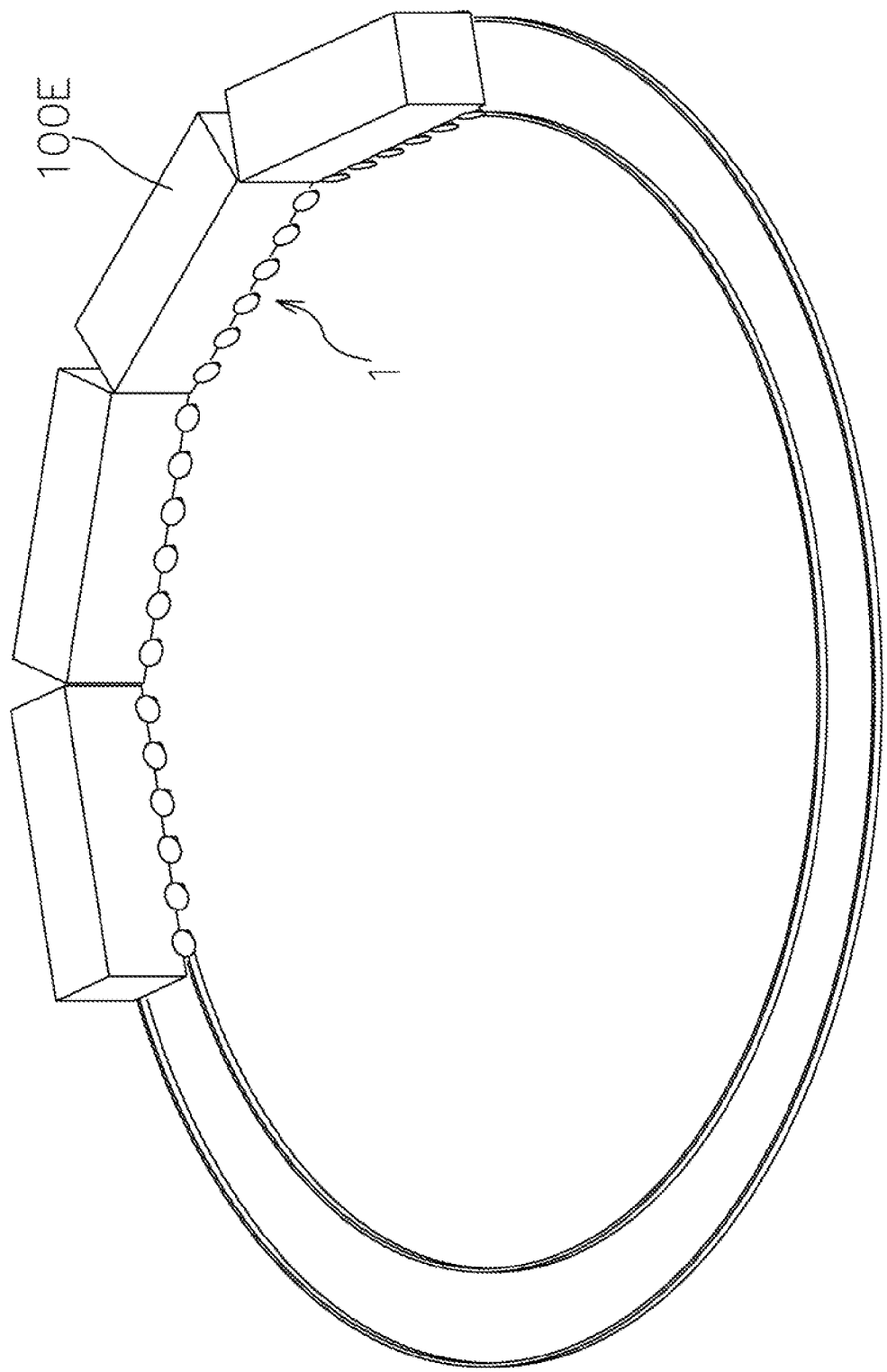
FIG. 15 is a schematic view of this disclosure applied to a rail vehicle.

With reference to FIG. 11 for a schematic view of an automobile roller-type power generating device of this disclosure applied to a motor vehicle, the automobile roller-type power generating device of this disclosure is installed to a motor vehicle 100A, and the power for moving the motor vehicle 100A forward is converted into electric energy. The motor vehicle 100A may have one or more camshafts 10, and each camshaft 10 may have a plurality of automobile roller-type power generating devices 1 of this disclosure to improve the amount of generated power significantly. In FIGS. 12 and 13, this disclosure may be applied to a large motor vehicle 100B, 100C (such as a train or a long car) to increase the amount of generated power. In FIG. 14, this disclosure is applied to a towed car 100D, and it is noteworthy that this disclosure is not just applicable to a motor vehicle with power only, but is also applicable to a motor vehicle without power, such as a towed car 100D. Therefore, this disclosure may be applied to various motor vehicles more flexibly. Since more than one power generating devices of this disclosure may be applied to a vehicle body, the amount of the generated power and the power generation efficiency are improved significantly. In FIG. 15, several power generating devices of this disclosure may be applied to a rail motor vehicle 100E running back and forth at fixed points or moving circularly in a circular road (or rail), and the amount of generated power is increased further, and a large power plant may be formed by such arrangement.

Figure 16:
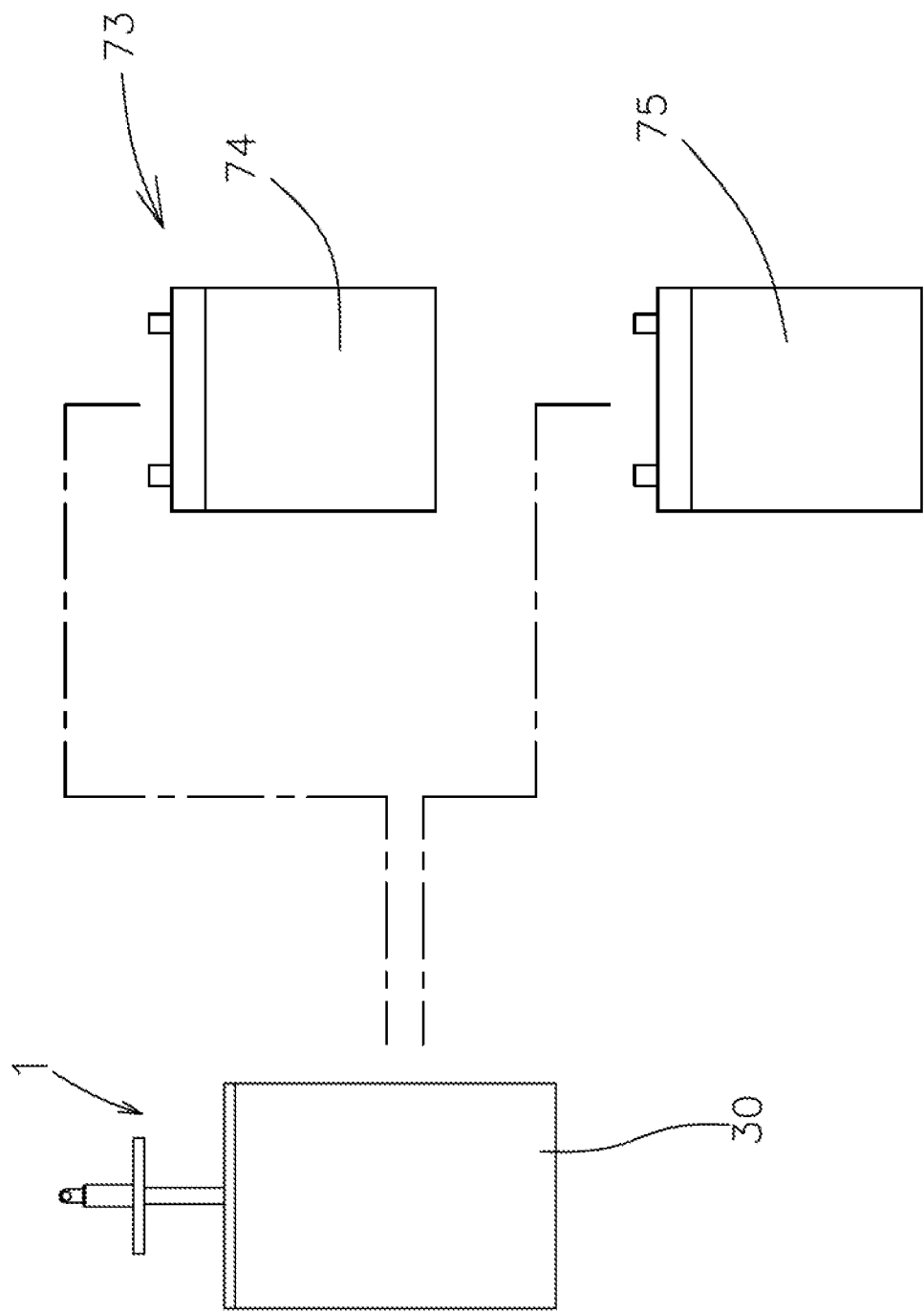
FIG. 16 is a schematic view of the structure for charging battery packs in accordance with this disclosure.

With reference to FIG. 16 for the application of charging batteries alternately in accordance with this disclosure, the power generating mechanism 30 includes an automatic controller (not shown in the figure), a battery pack 73 including at least two battery packs such as a first battery pack 74 and a second battery pack 75 coupled to a motor (or a power consuming device), and the power generating mechanism 30 is coupled to the battery pack 73, and its charging method is described below. If the first battery pack 74 supplies electric power to a motor or a power consuming device such as an air conditioner, an automobile lamp and a computer, a controller, and an alarm in a motor vehicle, and the remained power level is 10%~20%, then the automatic controller will drive the first battery pack 74 to temporarily stop supplying power, and will let the second battery pack 75 take over the power supply. Now, all power generating mechanisms 30 of this disclosure will charge the first battery pack 74 until the first battery pack 74 is fully charged. After the second battery pack 75 takes over the power supply and if its remained power level reaches 10%~20%, the automatic controller will drive the second battery pack 75 to temporarily stop supplying power and will let the first battery pack 74 to take over the power supply again. By this method, the power generating mechanisms 30 charge the two battery packs alternately.

Figure 17:
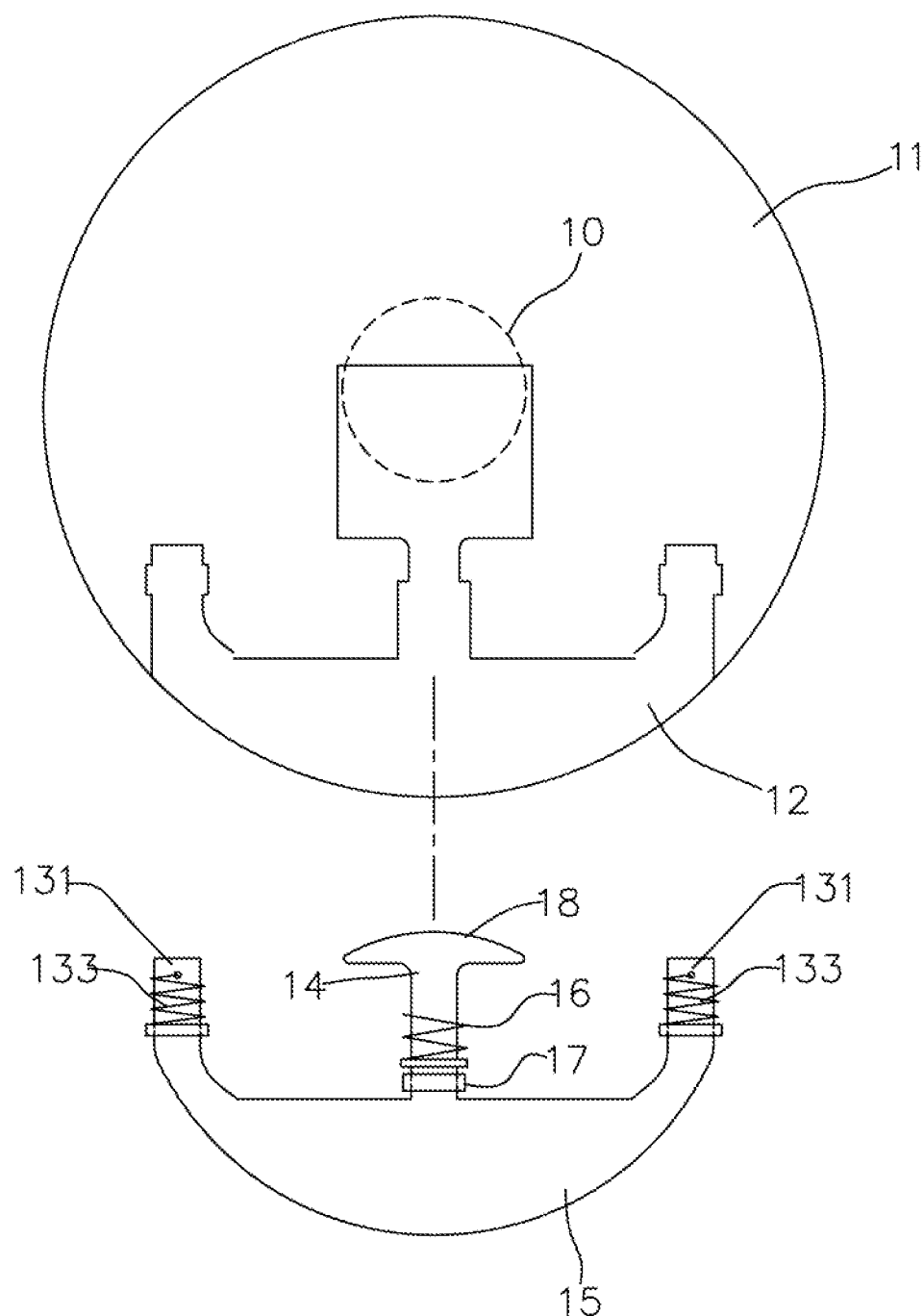
FIG. 17 is an exploded view of a push slider of the second preferred embodiment of this disclosure.
Figure 18:
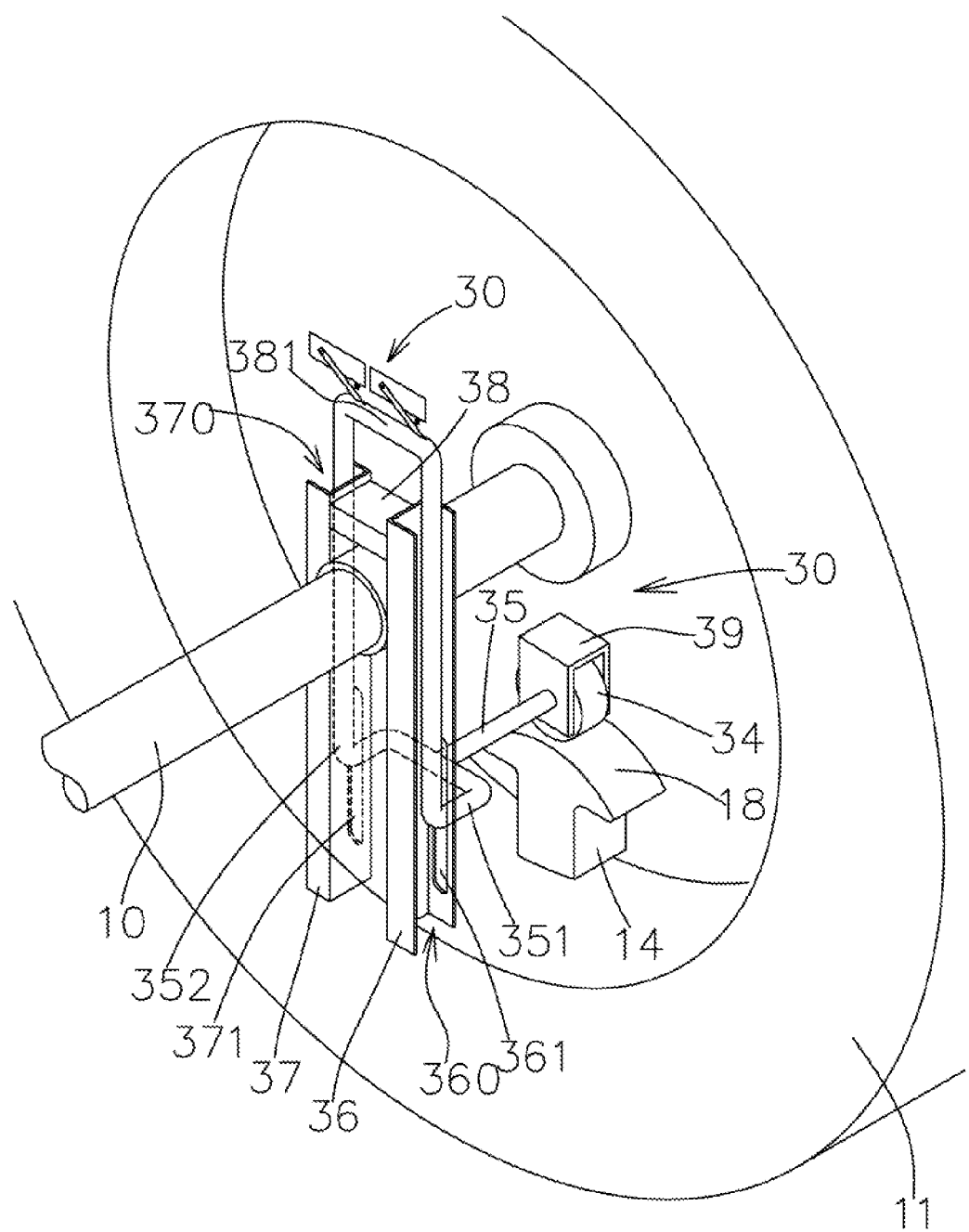
FIG. 18 is a first schematic view of the structure of a second preferred embodiment of this disclosure.

With reference to FIGS. 17 and 18 for the second preferred embodiment of this disclosure, this preferred embodiment is substantially the same as the first preferred embodiment except that the arc top 18 at the top of the pushrod 14 of this preferred embodiment (opposite to the other end of the arc bottom 15) and two side sliding members 131 at both sides of the pushrod 14 have free ends. In other words, the arc top 18 and the side sliding member 131 are not coupled to each other. In addition, the elastic pulley 34 of the power generating mechanism 30 has a connecting cover 39 for covering the top of the elastic pulley 34 and both lateral sides of the elastic pulley 34. The connecting cover 39 provides an effect of installing the elastic pulley 34 more securely to guide and eliminate the potential energy in the rotating and rubbing direction between the elastic pulley 34 and the arc top 18 (or the pushrod 14). The elastic pulley 34 is pivoted to a linkage rod 35. In the connecting cover 39 is fixed to the linkage rod 35, and the linkage rod 35 is linked and moved with the elastic pulley 34. The linkage rod 35 is installed in a direction slightly parallel to the camshaft 10, and the linkage rod 35 is extended in a direction away from the elastic pulley 34 and separated with a first linkage rod 351 and a second linkage rod 352. A first frame 36 and a second frame 37 (comprised of a fixed frame) are arranged opposite to each other, and the first frame 36 and the second frame 37 are coupled to the camshaft 10, and each of the first frame 36 and the second frame 37 has a notch space 360, 370 and an elongated through slot 361, 371, and each of the first linkage rod 351 and the second linkage rod 352 is passed through the elongated through slot 361, 371 and entered into the notch space 360, 370, and each of the first linkage rod 351 and the second linkage rod 352 in the notch space 360, 370 is extended upward (in a direction perpendicular to the camshaft 10). A connecting stand 38 is coupled between the first frame 36 and the second frame 37, so that the arc top 18 pushes the elastic pulley 34 to move up and down and links each of the first linkage rod 351 and the second linkage rod 352 in the notch space 360 of the first frame 36 and the notch space 370 of the second frame 37 to slide up and down. The tops of the first linkage rod 351 and the second linkage rod 352 are coupled by a connecting frame 381, so that the up and down movements of the first linkage rod 351, the second linkage rod 352 and the connecting frame 381 links the power generating mechanism 30 to generate power.

Figure 19:
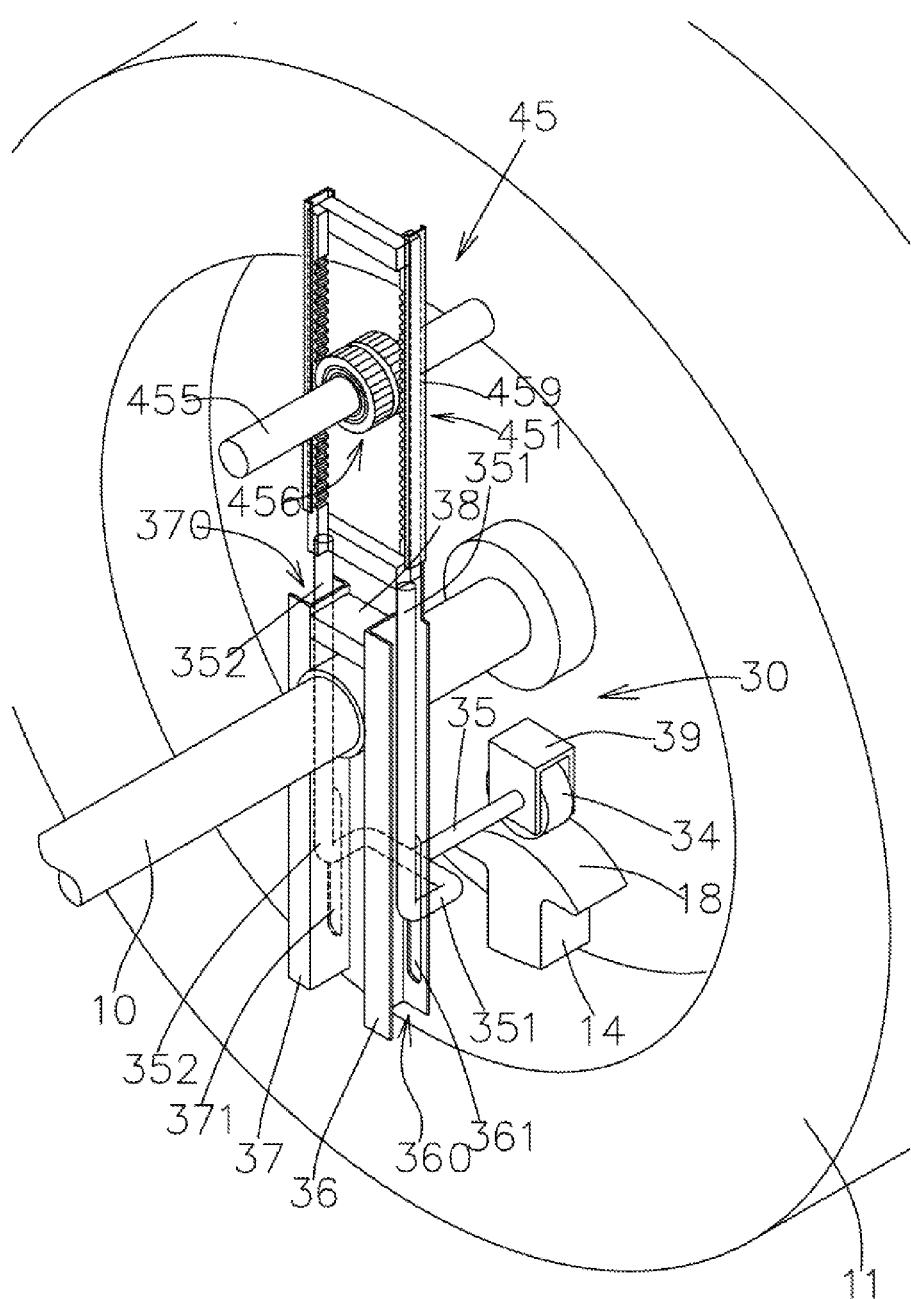
FIG. 19 is a second schematic view of the structure of the second preferred embodiment of this disclosure.

With reference to FIG. 19 for the application of the second preferred embodiment of this disclosure, the first linkage rod 351 and the second linkage rod 352 are moved up and down to link the gear power generator 45. In other words, the first linkage rod 351 and the second linkage rod 352 push the fixed frame 451 and then move the fixed frame 451 to move up and down and link the gear set 456 to rotate the rotary shaft 455. The rotary shaft 455 is rotated to drive the power generating module of the gear power generator 45 to generate power. Two fixed frames 451 of the gear power generator 45 are embedded into two fixed seats 459 respectively, and the fixed seat 459 is fixed to a motor vehicle, and the fixed seat 459 has a notch, so that the fixed frame 451 may be embedded into the notch and may slide up and down. The top position in the fixed seat notch 459 has a spring (not shown in the figure), wherein the top of the spring is fixed to the fixed seat notch 459 and the bottom of the spring is abutted at the fixed frame 451, so that the fixed frame 451 stores elastic potential energy when moving upward and moves downward when the upward pushing force is released. Therefore, the fixed frame 451 of the gear power generator 45 has the reciprocating up and down movements.

Figure 20:
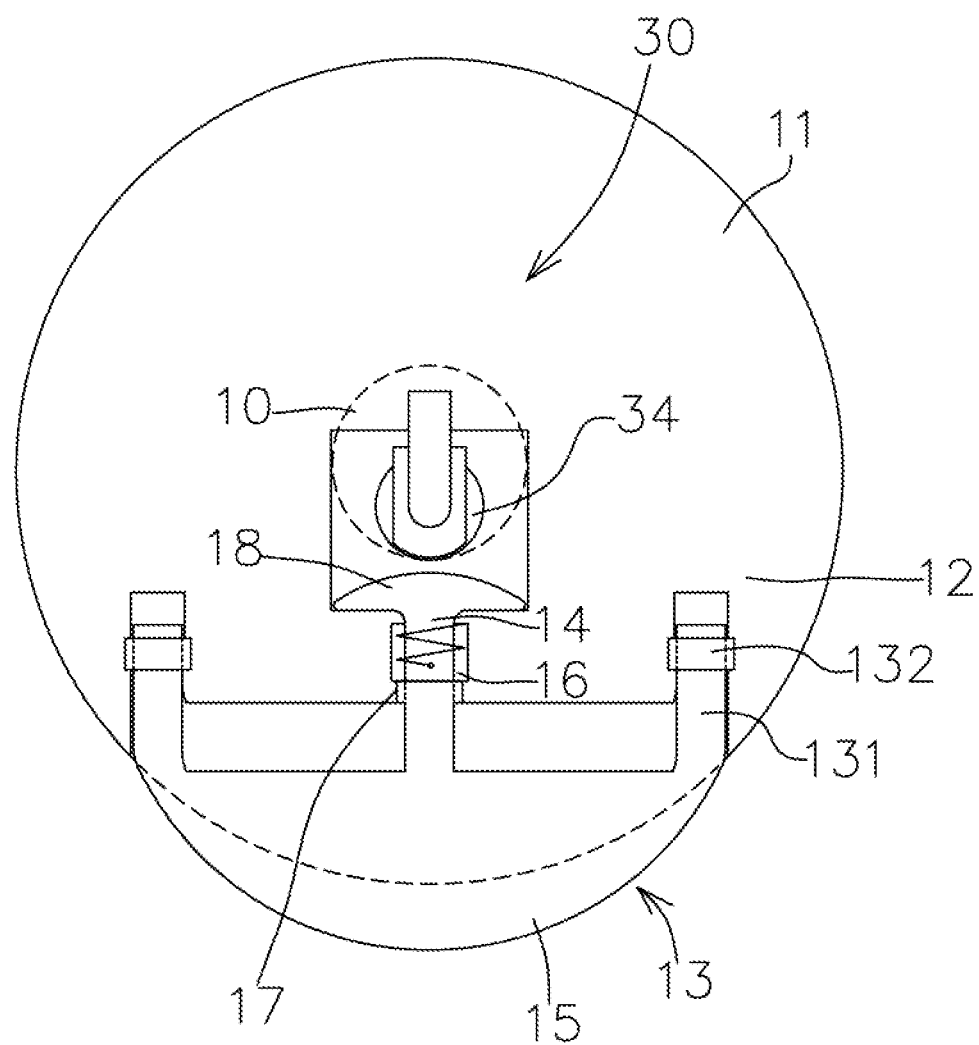
FIG. 20 is a first schematic view of an operating status of the second preferred embodiment of this disclosure.
Figure 21:
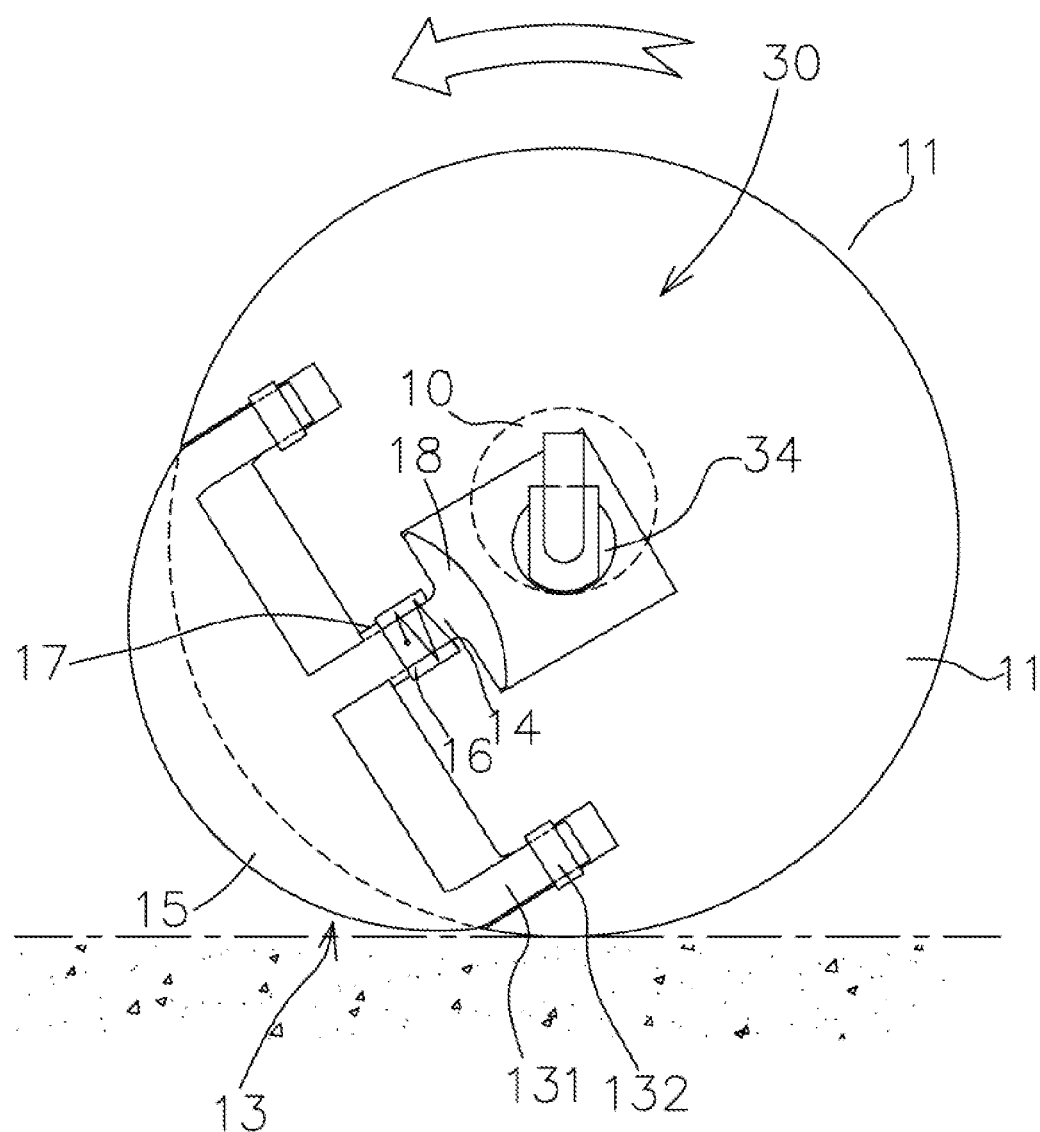
FIG. 21 is a second schematic view of an operating status of the second preferred embodiment of this disclosure.
Figure 22:
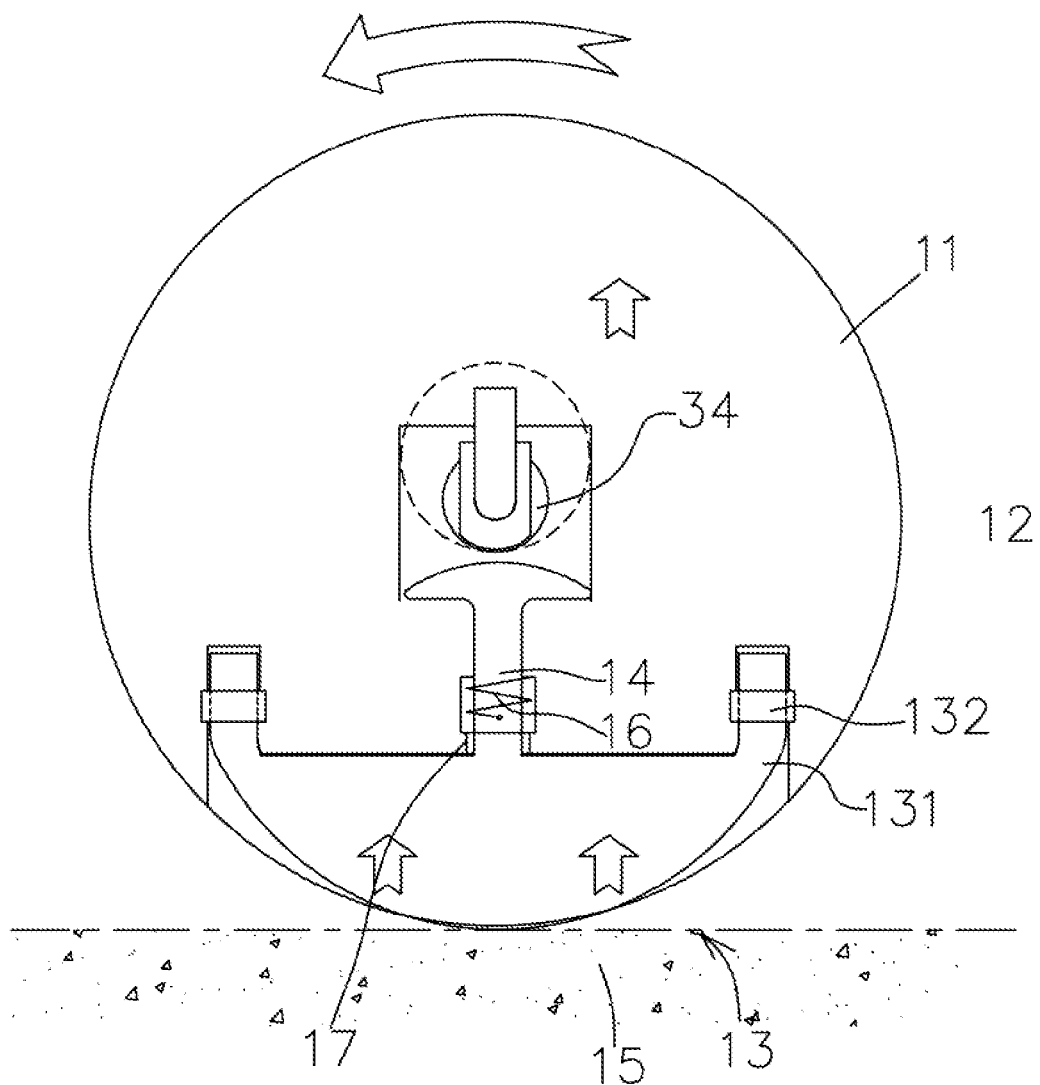
FIG. 22 is a third schematic view of an operating status of the second preferred embodiment of this disclosure.
Figure 23:
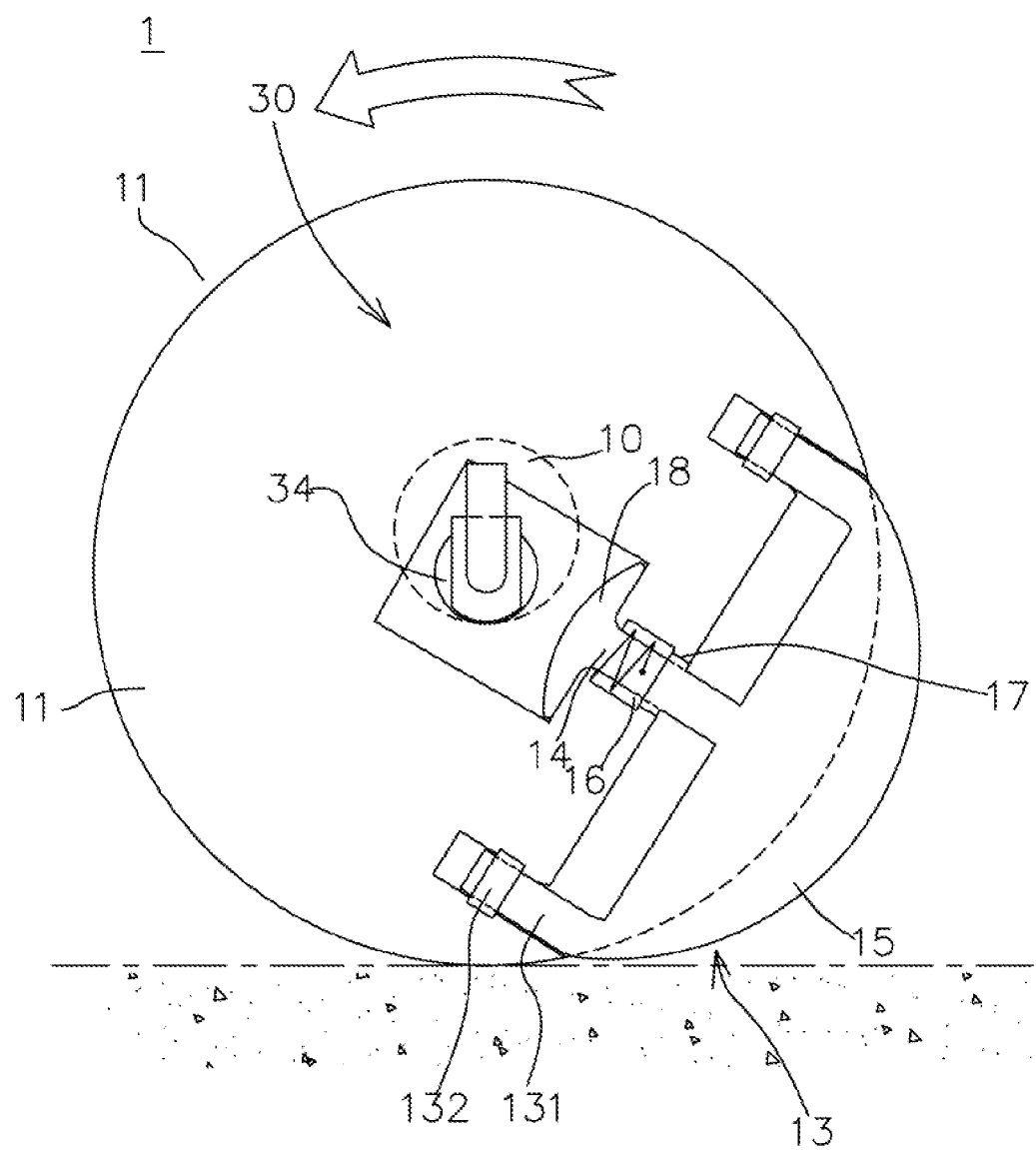
FIG. 23 is a fourth schematic view of an operating status of the second preferred embodiment of this disclosure.

With reference to FIGS. 20 to 23 for an automobile roller-type power generating device in accordance with the second preferred embodiment of this disclosure, the power generating device is rotated in a round. When the pushrod 14 of the push slider 13 slides upward, the kinetic energy is transmitted to the elastic pulley 34 of the power generating mechanism 30, and then the linkage rod 35 slides upward with the elastic pulley 34 and transmits kinetic energy to the power generating module of the power generating mechanism 30 to generate power (as shown in FIG. 20), so that the kinetic energy can be continuously converted into electric energy and the electric energy is stored into the battery.

What is claimed is:

1. An automobile roller-type power generating device, installed at the bottom of a vehicle body, comprising:
    at least one roller, pivotally coupled to a camshaft of the vehicle body, and touching the ground when the roller is rolling, and the roller having at least one notch;
    at least one push slider, installed in the notch, and having at least one pushrod, and an end of the push slider touching the ground having an arc bottom, and the pushrod being abutted by a spring and protruded in a direction towards an outer side of the roller;
    at least one power generating mechanism, installed at a corresponsive abutting position of the pushrod;
    at least one battery, electrically coupled to the power generating mechanism;
    such that when the vehicle body is moving, the automobile roller-type power generating device drives the roller to roll, and the push slider presses the ground and retracts and slides to transmit kinetic energy to the power generating mechanism, and the power generating mechanism converts the kinetic energy into electric energy which is stored in the battery.

2. The automobile roller-type power generating device according to claim 1, wherein the spring is positioned and abutted at the notch to push the pushrod, and the pushrod is passed and installed to a bearing in the notch.

3. The automobile roller-type power generating device according to claim 1, wherein the pushrod has an arc top disposed opposite to the other end of the arc bottom, and the arc top has an arc sliding surface.

4. The automobile roller-type power generating device according to claim 1, wherein the notch has a side notch formed on each of both sides of the notch, and a side sliding member is coupled to each of both sides of the push slider, and the side sliding member is coupled to a side of the arc bottom, and the side sliding member slides with respect to the side notch, and at least one of the side sliding members is passed and installed to a bearing in the side notch.

5. The automobile roller-type power generating device according to claim 4, wherein the side sliding members on both sides of the push slider are integrally coupled to a side opposite to the arc top.

6. The automobile roller-type power generating device according to claim 5, wherein the pushrod includes an upper-section pushrod and a lower-section pushrod separated from each other, and the position of separating the upper-section pushrod and the lower-section pushrod is the cross-sectional position of the camshaft.

7. The automobile roller-type power generating device according to claim 1, wherein the power generating mechanism comprises:
- a fixed frame, installed and fixed to the vehicle body;
- a linkage rod, having an elastic pulley pivoted thereto; and
- a kinetic energy converting mechanism, linked by the linkage rod.

8. The automobile roller-type power generating device according to claim 7, wherein the elastic pulley is pivoted to a connecting cover and the connecting cover is installed to a lower distal point of the linkage rod.

9. The automobile roller-type power generating device according to claim 7, wherein the kinetic energy converting mechanism is a pedal power generator, a linear power generator, a touch pressing power generator, a gear power generator, a hydraulic power generator, or a combination thereof.

10. The automobile roller-type power generating device according to claim 9, wherein the hydraulic power generator comprises a hydraulic pump, a hydraulic bar installed to the hydraulic pump, an oil inlet pipe coupled to the hydraulic pump, a hydraulic motor coupled to the oil inlet pipe and including a vane module and a power generating module, and an oil return pipe coupled to the hydraulic motor, and the oil return pipe is coupled to the hydraulic pump to form a pipeline circulation system.

11. The automobile roller-type power generating device according to claim 9, wherein the gear power generator comprises a fixed frame and a transmission module, and the fixed frame is a frame installed at a pushing position of the linkage rod for positioning the transmission module, and the fixed frame includes a first tooth pattern portion and a second tooth pattern portion disposed on sides opposite to each other and are staggered with respect to each other, and the transmission module includes a rotary shaft and a gear set installed to the rotary shaft and passed into the frame, and the gear set is designed with a ratchet gear, and the gear set includes a first gear and a second gear arranged parallel to each other, and the first gear is engaged with the first tooth pattern portion, and the second gear is engaged with the second tooth pattern portion; and a power generating module has a rotor, and a power generating assembly of a stator, and the power generating module is coupled to the rotary shaft, and the rotary shaft is rotate to drive the power generating module to generate power.

12. The automobile roller-type power generating device according to claim 7, wherein the fixed frame includes a first frame and a second frame, and each of the first frame and the second frame has a notch space, and the linkage rod is extended in a direction away from the elastic pulley and separated into a first linkage rod and a second linkage rod, and each of the first linkage rod and the second linkage rod is extended upwardly in the respective notch space of the first frame and the second frame, and tops of the first linkage rod and the second linkage rod are coupled by a connecting frame, so that the first linkage rod, the second linkage rod and the connecting frame may be moved vertically to link the power generating mechanism to generate power.

13. The automobile roller-type power generating device according to claim 12, wherein each of the first frame and the second frame has an elongated through slot, a connecting stand is coupled between the first frame and the second frame, and each of the first frame and the second frame is fixed and coupled to the camshaft.

14. The automobile roller-type power generating device according to claim 1, further comprising an automatic controller, and the battery having at least two battery packs and being coupled to a motor, and the two battery packs being a first battery pack and a second battery pack respectively and charged by a power generator according to a method comprising the steps of supplying power from the first battery pack to a power consuming device, temporarily stopping the power supply from the first battery pack through the control of an automatic controller and allowing the second battery pack to take over the power supply, if the remained power level of the first battery pack is 10%~20%, and charging the first battery pack through all power generators until the first battery pack is fully charged, and temporarily stopping the power supply from the second battery pack through the control of the automatic controller if the remained power level of the second battery pack is 10%~20%, such that the first battery pack takes over the power supply again, so that the power generators charge the two battery packs alternately.

\* \* \* \* \*